United States Patent
Schiffmann

(10) Patent No.: US 6,192,305 B1
(45) Date of Patent: Feb. 20, 2001

(54) VEHICLE ROLLOVER SENSING USING YAW RATE ESTIMATION

(75) Inventor: Jan Konried Schiffmann, Newbury Park, CA (US)

(73) Assignee: Delco Electronics Corporation, Kokomo, IN (US)

(*) Notice: Under 35 U.S.C. 154(b), the term of this patent shall be extended for 0 days.

(21) Appl. No.: 09/080,107

(22) Filed: May 18, 1998

Related U.S. Application Data

(63) Continuation-in-part of application No. 09/019,878, filed on Feb. 6, 1998, now Pat. No. 6,002,974.

(51) Int. Cl.[7] .............................. B60G 17/00; B60R 21/32
(52) U.S. Cl. ............................ 701/45; 180/271; 180/282; 280/735
(58) Field of Search ................................. 701/36, 37, 38, 701/39, 45, 46, 49; 180/271, 281, 282; 280/734, 735, 756, 801.1; 340/440

(56) References Cited

U.S. PATENT DOCUMENTS

| | | | |
|---|---|---|---|
| 5,610,575 | * 3/1997 | Gioutsos | 340/429 |
| 5,825,284 | * 10/1998 | Dunwoody et al. | 340/440 |
| 5,890,084 | * 3/1999 | Halasz et al. | 701/45 |

* cited by examiner

Primary Examiner—William A. Cuchlinski, Jr.
Assistant Examiner—Edward Pipala
(74) Attorney, Agent, or Firm—Jimmy L. Funke

(57) ABSTRACT

A rollover sensing apparatus and method are provided for predicting rollover or pitchover conditions of a vehicle. The apparatus and method sense angular roll rate, angular pitch rate, longitudinal acceleration, lateral acceleration, and vertical acceleration of the vehicle and produce output signals indicative thereof. A non-linear filter, such as an extended Kalman filter, estimates a current roll angle and a current pitch angle as a function of the sensed signals. A predictor predicts a future roll angle as a function of the estimated current roll angle and the sensed roll rate, and further predicts a future pitch angle as a function of the estimated current pitch angle and the sensed pitch rate. The predicted roll and pitch attitude angles are compared to a threshold value and a vehicle overturn condition signal is output to indicate a predicted vehicle rollover or pitchover condition. In addition, the measured pitch rate and roll rate signals are corrected to compensate for yaw-induced error that may be present.

28 Claims, 11 Drawing Sheets

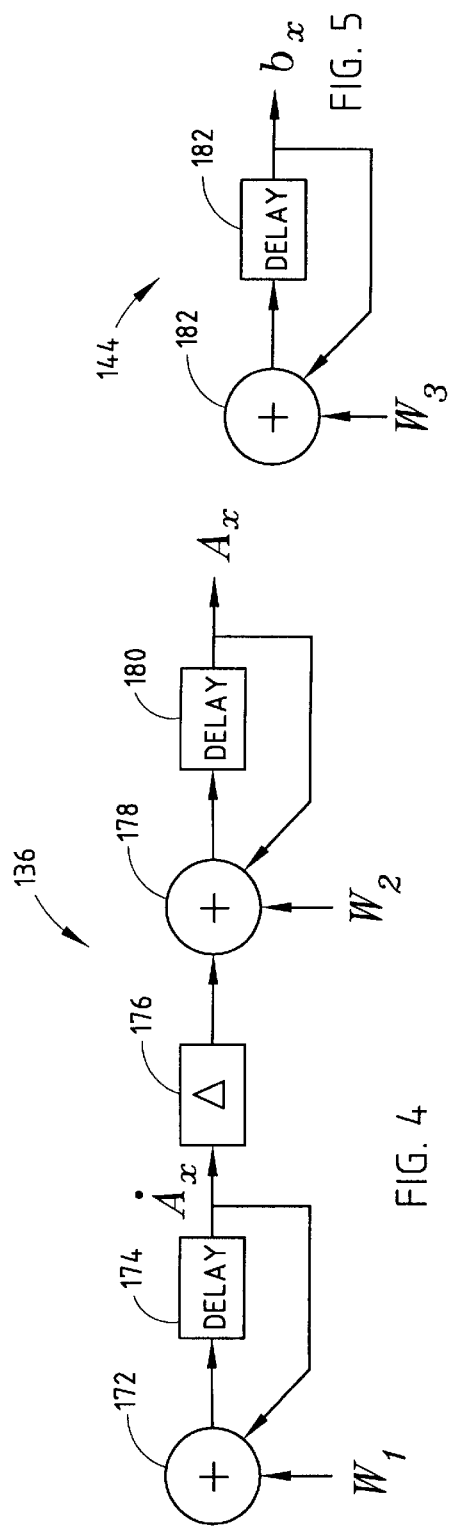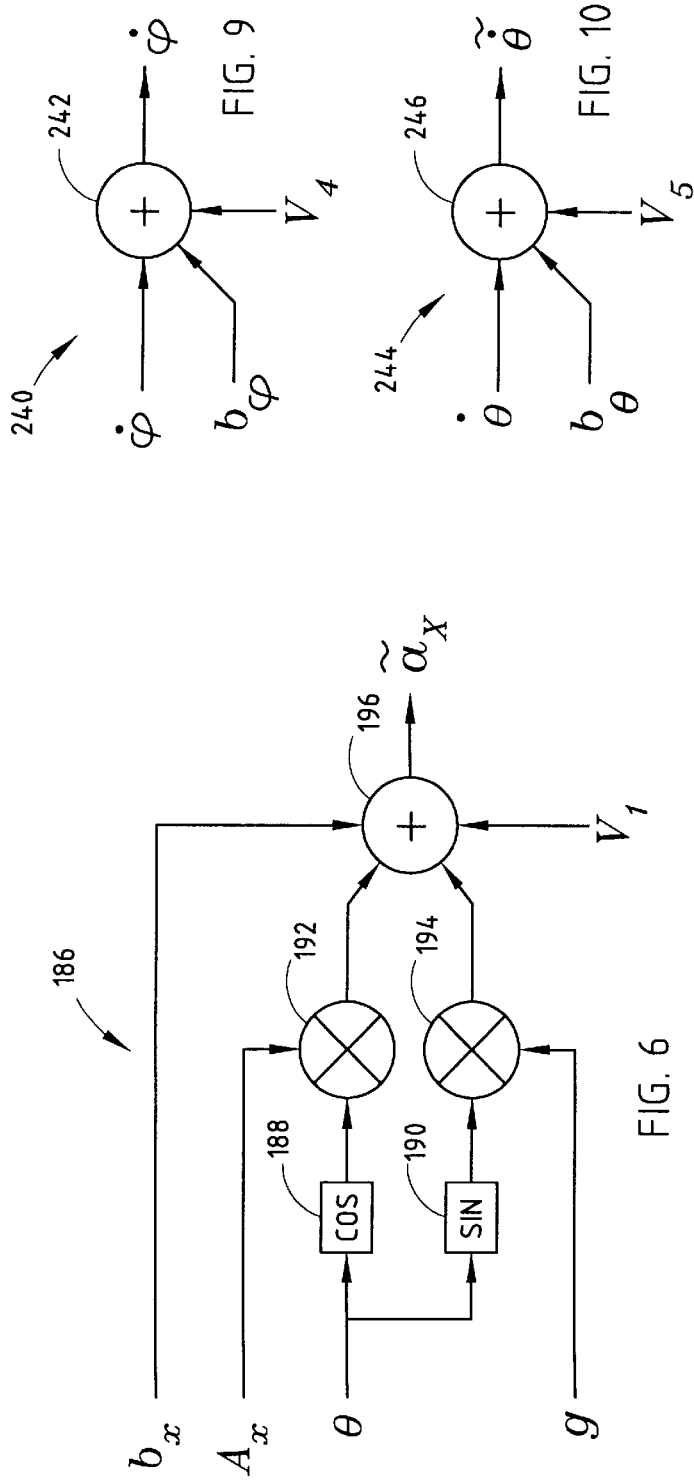

VEHICLE ROLLOVER SENSING USING YAW RATE ESTIMATION

CROSS-REFERENCE TO RELATED APPLICATION

This application is a continuation-in-part of U.S. patent application Ser. No. 09/019,878, filed Feb. 6, 1998, now U.S. Pat. No. 6,002,974.

BACKGROUND OF THE INVENTION

The present invention generally relates to rollover sensors and, more particularly, to low-cost vehicle rollover sensors for sensing a rollover or pitchover condition of a vehicle.

Future generation automotive vehicles may increasingly employ safety-related devices that deploy in the event that the vehicle rolls over to provide added protection to the occupants of the vehicle. For example, upon detecting a vehicle rollover condition, a pop-up roll bar can be deployed such that, when activated, the roll bar further extends vertically outward to increase the height of support provided by the roll bar. Other controllable features may include actuating deployment of one or more air bags, such as front or side deployment air bags, or actuating a pretensioner to pretension a restraining device, such as a seat belt or safety harness, to prevent occupants of the vehicle from ejecting from the vehicle or colliding with the roof of the vehicle.

In the past, basic rollover sensors have been employed in automotive vehicles to measure the angular position of the vehicle from which a rollover condition can be determined. The basic rollover sensors have included the use of a pendulum normally hanging vertically downward due to the earth's gravitational force. Many basic automotive sensing devices are employed simply to monitor the angular position of the vehicle relative to a level ground horizontal position. As a consequence, the basic automotive vehicle rollover sensors have generally been susceptible to error when the vehicle travels around a turn or becomes airborne, in which case the earth's gravitational force, which the sensor relies on, may be overcome by other forces.

More recently, sophisticated rollover sensing approaches have been considered. One such approach considered requires the use of six sensors including three accelerometers and three angular rate sensors, also referred to as gyros, all of which are employed together for use in an inertial navigation system which tracks position and attitude of the vehicle. The three accelerometers generally provide lateral, longitudinal, and vertical acceleration measurements of the vehicle, while the three gyros measure pitch rate, roll rate, and yaw rate. However, the more sophisticated rollover sensing approaches generally require a large number of high-precision and expensive sensors. In addition, known sophisticated systems are susceptible to cumulative drift errors, and therefore must be reset occasionally.

It is, therefore, one object of the present invention to provide for vehicle rollover and pitchover sensing that requires minimal sensed measurement parameters and is relatively immune to errors generally found in conventional automotive-grade sensors. It is another object of the present invention to provide for vehicle rollover sensing for an automotive vehicle that may predict a future rollover condition in advance to allow time to deploy occupant protection measures. It is a further object of the present invention to provide for reliable vehicle rollover sensing in a low-cost sensing module. Yet, it is also another object of the present invention to achieve vehicle rollover sensing that corrects signal measurements to correct for errors caused by the vehicle experiencing yaw rate.

SUMMARY OF THE INVENTION

In accordance with the teachings of the present invention, a vehicle rollover sensing apparatus and method are provided for predicting an overturn condition of a vehicle. The apparatus includes an angular roll rate sensor for sensing roll rate of the vehicle and an angular pitch rate sensor for sensing pitch rate of the vehicle. The apparatus also includes a longitudinal accelerometer for measuring longitudinal acceleration of the vehicle, a lateral accelerometer for measuring lateral acceleration of the vehicle, and a vertical accelerometer for measuring vertical acceleration of the vehicle. The apparatus further receives a vehicle speed signal indicative of speed of the vehicle. A processor receives the signals and estimates a roll angle and a pitch angle as a function of the received signals. The processor estimates a yaw rate of the vehicle as a function of lateral acceleration and vehicle speed and determines a pitch rate correction value as a function of the estimated yaw rate and the estimated roll angle and further corrects the measured pitch rate signal based on the pitch correction value. The processor also predicts a future pitch angle as a function of the estimated pitch angle and the corrected pitch rate and compares the predicted pitch angle to a threshold value. An output is provided for deploying a vehicle overturn condition based on the comparison.

In addition or alternately, the processor determines a roll rate correction value as a function of the estimated yaw rate and the estimated pitch angle and corrects the measured roll rate signal based on the roll correction value. The processor further predicts a future roll angle as a function of the estimated roll angle and the corrected roll rate and compares the predicted roll angle to a threshold value to predict a rollover condition of the vehicle. An output is provided for deploying a vehicle overturn condition based on the comparison.

A method is also provided for predicting an overturn condition of a vehicle. The method includes sensing angular roll rate and angular pitch rate of a vehicle. The method further senses longitudinal acceleration, lateral acceleration, and vertical acceleration of the vehicle. The method further receives a vehicle speed signal indicative of speed of the vehicle. A roll angle and pitch angle are estimated as a function of the received signals, and a yaw rate of the vehicle is estimated as a function of lateral acceleration and the vehicle speed signal. The method further determines a pitch rate correction value as a function of the estimated yaw rate and the estimated roll angle and corrects the measured pitch rate signal based on the pitch corrected value. A future pitch angle is predicted as a function of the estimated pitch angle and corrected pitch rate and compared to a threshold value. The method deploys a vehicle overturn condition output based on the comparison step.

In addition or alternately, the method determines a roll correction value as a function of the estimated yaw rate and the estimated pitch angle and corrects the measured roll rate signal based on the roll correction value. The method further includes the steps of predicting a future roll angle as a function of the estimated roll angle and the corrected roll rate and comparing the predicted roll angle to a roll threshold value and deploying an output based on the roll comparison.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

In the drawings:

FIG. 4 is a block diagram illustrating a second-order kinematic model of process dynamics used for the roll and pitch angle and earth acceleration models of FIG. 3;

FIG. 5 is a block diagram illustrating a first-order kinematic model of process dynamics used for the sensor bias models of FIG. 3;

FIG. 6 is a block diagram illustrating the measurement model for the longitudinal acceleration signal of FIG. 3;

FIG. 9 is a block diagram illustrating a measurement model for the angular roll rate signal of FIG. 3;

FIG. 10 is a block diagram illustrating a measurement model for the angular pitch rate signal of FIG. 3;

DETAILED DESCRIPTION OF THE PREFERRED EMBODIMENTS

Figure 1:
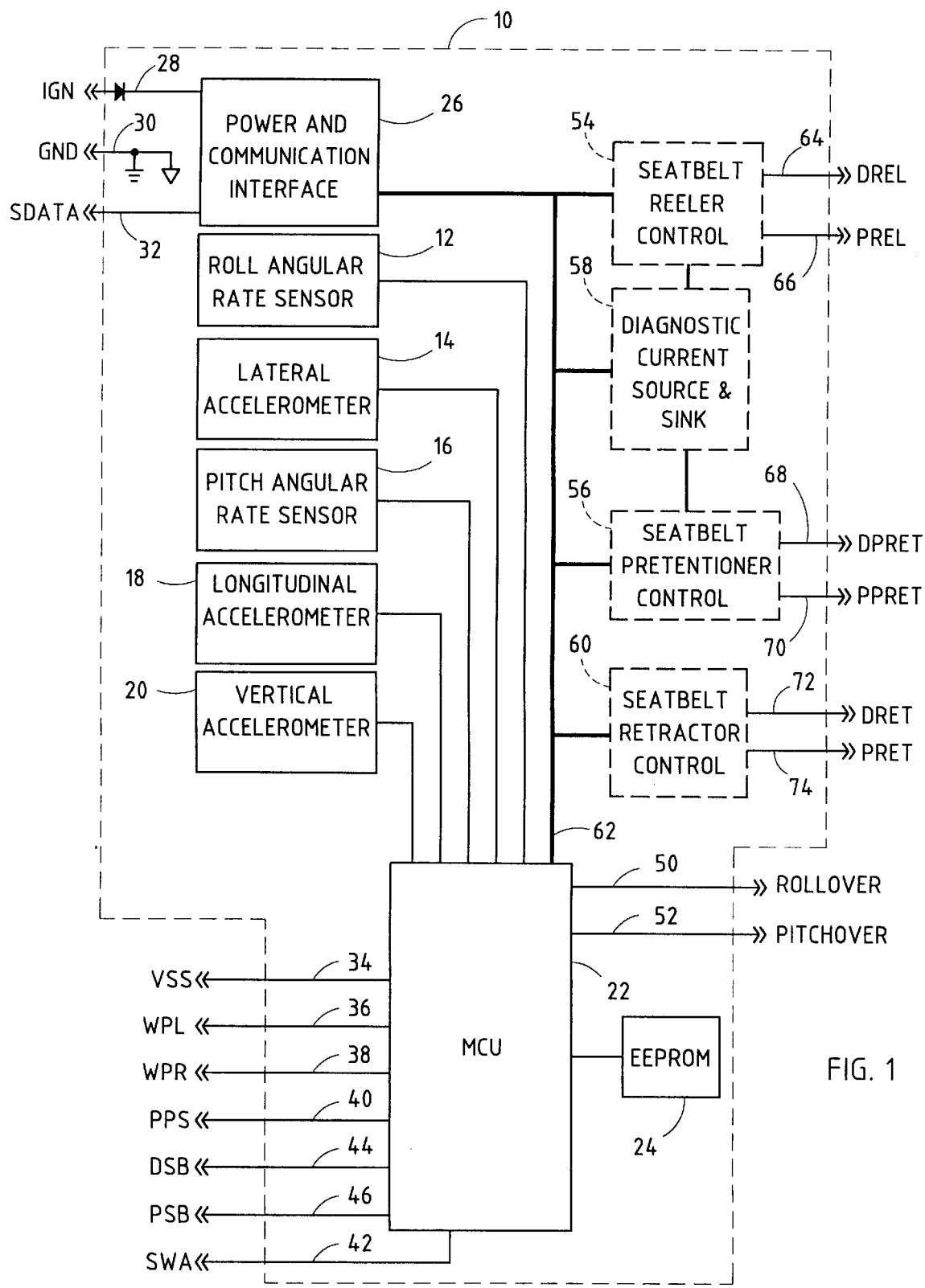
FIG. 1 is a block diagram of a rollover sensing module for sensing vehicle rollover and pitchover according to the present invention.

Referring to FIG. 1, a rollover sensing module 10 is illustrated for use in sensing vehicle attitude angular rate and acceleration dynamics, estimating angular roll and pitch angles, and predicting a rollover and/or pitchover condition of an automotive vehicle (not shown). The rollover sensing module (RSM) 10 of the present invention is preferably mounted on an automotive vehicle and used to predict in advance a future rollover or pitchover condition of the vehicle. A vehicle rollover condition, as described herein in connection with the present invention, may include side-to-side rotation of the vehicle about the vehicle's longitudinal axis, commonly referred to as a "vehicle rollover," and back-to-front rotation about the vehicle's lateral axis, commonly referred to as a "vehicle pitchover," or a combination of rollover and pitchover. For purposes of describing the rollover sensing of the present invention, the term "rollover" is generally used to refer to either a rollover condition or a pitchover condition.

The rollover sensing module 10 is designed to be located in an automotive vehicle to sense vehicle dynamics and predict a rollover or pitchover condition of the vehicle. Upon predicting a vehicle rollover or pitchover condition, the rollover sensing module 10 provides an output signal indicative of the predicted rollover or pitchover condition. The rollover or pitchover condition output signal may be supplied to one or more selected vehicle devices, such as safety-related devices, to actuate the selected devices in anticipation of an upcoming rollover event. The predicted rollover or pitchover condition output signal may be employed to deploy a pop-up roll bar to provide extended lateral support to the occupants of the vehicle just prior to the actual vehicle rollover occurring. Similarly, the predicted rollover or pitchover condition output signal may actuate an occupant restraining device, such as a seat belt or safety harness pretensioner to eliminate slack in the restraining device just prior to the vehicle rollover occurring. Other controlled functions include deployment of front and/or side deployment air bags to protect the vehicle occupants during a vehicle rollover. These and other devices may be controlled in response to the rollover condition output signal.

The rollover sensing module 10 includes five sensors, all preferably assembled together on module 10, and oriented to perform the intended sensing operation. The sensors include a roll angular rate sensor 12, a pitch angular rate sensor 16, a lateral accelerometer 14, a longitudinal accelerometer 18, and a vertical accelerometer 20. The roll angular rate sensor 12 measures the time rate of angular roll about the vehicle's longitudinal axis, while the pitch rate sensor 16 measures the time rate of angular pitch about the vehicle's lateral axis. The lateral accelerometer 14 measures horizontal acceleration of the vehicle along the vehicle's lateral axis. The longitudinal accelerometer 18 measures horizontal acceleration of the vehicle along the vehicle's longitudinal axis. The vertical accelerometer 20 measures the vertical acceleration of the vehicle along the vehicle's vertical axis. A rollover sensing module having five sensors is described in U.S. patent application Ser. No. 09/020,140, filed Feb. 6, 1998, entitled "Vehicle Rollover Sensing," to Jan Schiffmann et al., the disclosure of which is hereby incorporated by reference.

The rollover sensing module 10 further includes a microprocessor control unit (MCU) 22 for processing sensed vehicle parameters according to a rollover sensing algorithm to predict vehicle rollover and pitchover conditions. MCU 22 is preferably a microprocessor-based controller and, according to one example, may include Model No. HC12 made available by Motorola. Associated with MCU 22 is an electrically erasable programmable read-only memory (EEPROM) 24 that stores various programmed calibrations for performing the rollover sensing algorithm, as is explained hereinafter. The EEPROM 24 can be integrated with the MCU 22 or provided external thereto. Rollover sensing module 10 further includes a power and communication interface 26 for receiving an ignition IGN1 signal on line 28 and communicating via serial data (SDATA) on serial data bus 32. Rollover sensing module 10 is further grounded via ground line 30. Power and communication interface 26 converts an approximately 12-volt DC IGN1 signal input to 5-volts DC for use as a power supply to the components on module 10. Serial data communicated on data bus 32 may include individual sensor outputs and processor outputs as well as programmed inputs.

MCU 22 receives, as inputs, signals from each of sensors 12–20. In addition, the MCU 22 receives other various inputs that may be employed in connection with the rollover and pitchover predicting of the present invention. These inputs may include a vehicle speed sensor (VSS) signal 34 indicative of the speed of the vehicle and auxiliary left and right wheel position sensors (WPL) and (WPR) signals 36 and 38 for providing an indication of whether the wheels on either the left or right side of the vehicle are not in contact with the ground. The auxiliary wheel position sensors signals 36 and 38 are wheel position measurements taken relative to the body of the vehicle. Other inputs include a passenger presence (PPS) signal 40, which may be generated as a sensed output from an occupant presence sensor for purposes of sensing the presence of a passenger. A driver's seat belt (DSB) signal 44 and a passenger's seat belt (PSB) signal 46 indicate the use of driver and passenger seat belts, respectively. Also provided is a steering wheel angle (SWA) signal 42 for providing an indication of the current vehicle steering wheel angle relative to the longitudinal axis of the vehicle.

MCU 22 processes the various input signals, as will be explained hereinafter, and produces output signals identified as ROLLOVER signal 50 and PITCHOVER signal 52, which are indicative of a predicted vehicle rollover condition and a predicted pitchover condition, respectively. In addition, MCU 22 provides the predicted rollover and pitchover output signals on line 62 to control designated onboard control devices, such as a seat belt reeler control 54, a lap seat belt pretensioner control 56, and a seat belt retractor control 60. Seat belt reeler control 54 controls the seat belt reeler for both the driver's side and passenger's side via respective signals DREL and PREL as provided on output line 64 and 66, respectively. Seat belt pretensioner control 56 likewise controls seat belt pretensioning for the driver's side and passenger's side via signals DPRET and PPRET as provided on output lines 68 and 70, respectively. A diagnostic current source and sink 58 allows for diagnostic testing of the seat belt reeler control 54 and seat belt pretensioner 56. The seat belt retractor control 60 controls retractor locks associated with the seat belt to both the driver's seat belt and passenger's seat belt via signals DRET and PRET, as provided on output lines 72 and 74.

Figure 2A:
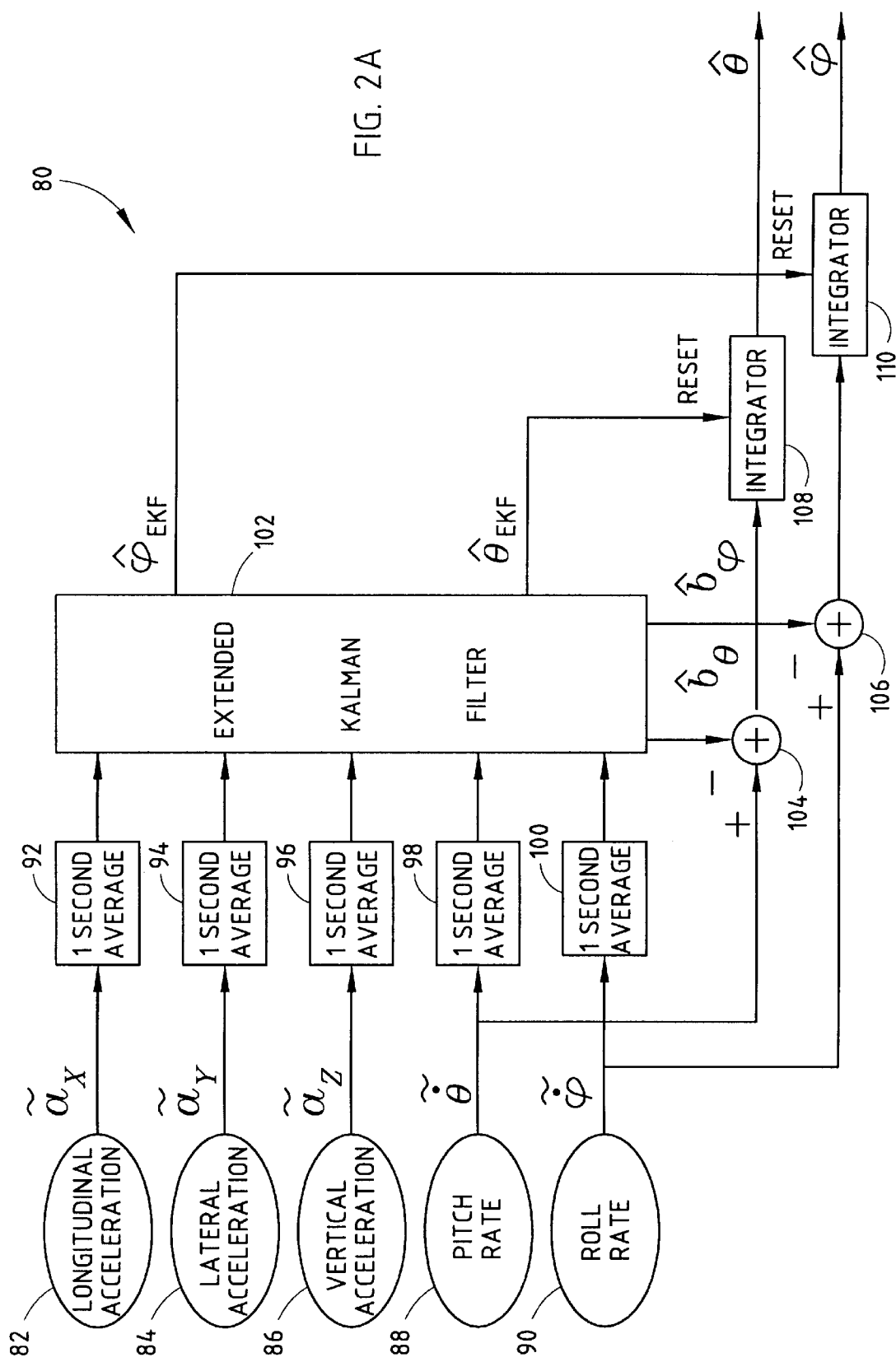
FIGS. 2A and 2B are block diagrams which together illustrate a rollover sensing algorithm for estimating current roll and pitch angles and predicting vehicle rollover and pitchover according to the present invention.
Figure 2B:
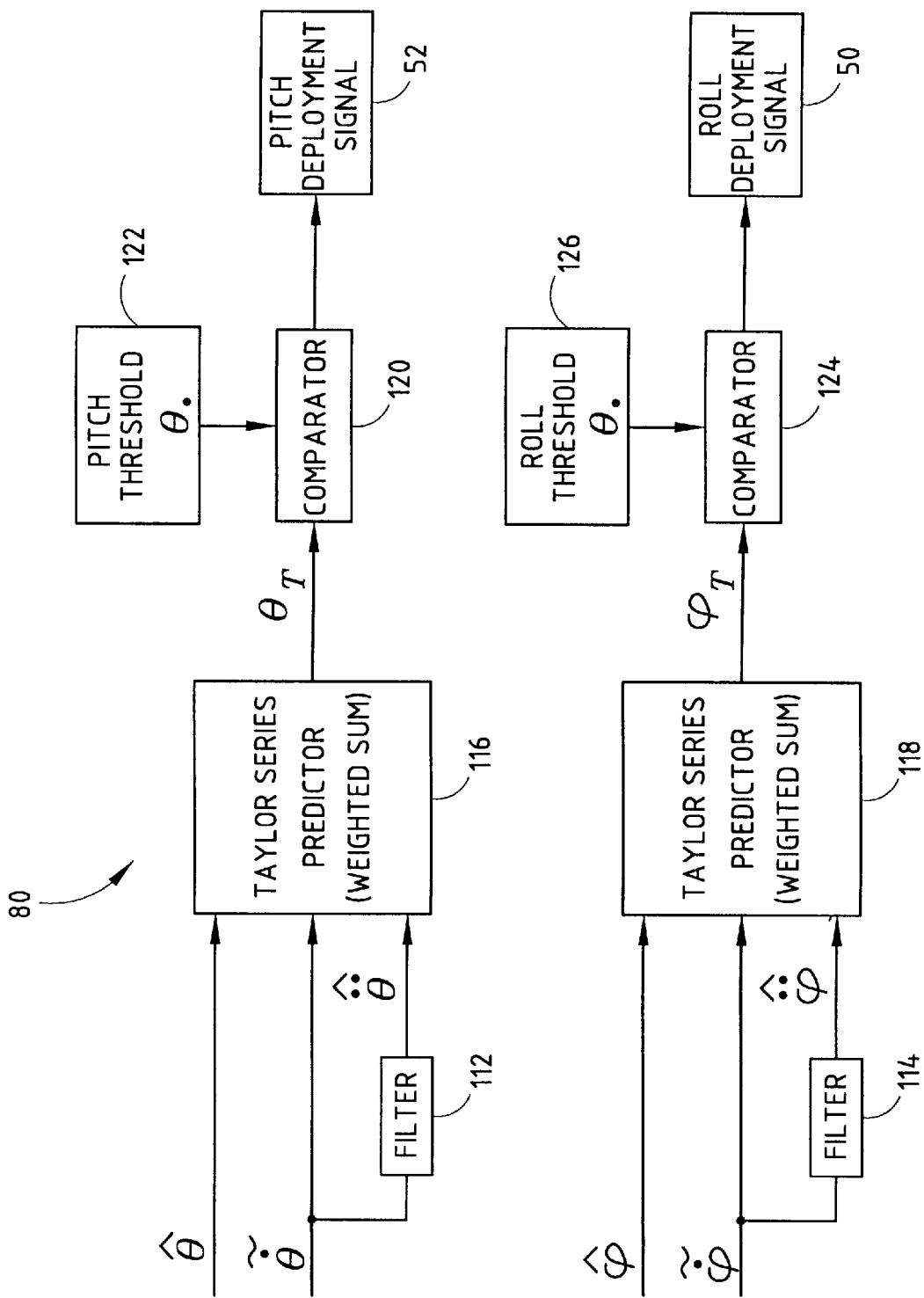

Referring to FIGS. 2A and 2B, a rollover prediction algorithm 80 is shown for estimating the current roll angle $\phi$ and pitch angle $\theta$, and predicting a vehicle rollover about the longitudinal axis or a pitchover about the lateral axis of the vehicle. Rollover prediction algorithm 80 is preferably implemented in software that is stored in EEPROM 24 and operated upon via the microprocessor control unit 22. However, it should be appreciated that the algorithm 80 of predicting a rollover or pitchover condition of a vehicle according to the present invention can be implemented in analog circuitry as well as digital processing. It should also be appreciated that rollover prediction algorithm 80 may also be used to provide continuous estimates of the current and future values of the attitude angles (i.e., roll and pitch angles) of the vehicle.

Vehicle rollover prediction algorithm 80 receives a longitudinal acceleration signal $\tilde{a}_x$ 82 from the longitudinal accelerometer 18, a lateral acceleration signal $\tilde{a}_y$ 84 from the lateral accelerometer 14, and a vertical acceleration signal $\tilde{a}_z$ from the vertical accelerometer 20. In addition, vehicle rollover prediction algorithm 80 receives a pitch angular rate signal 88 from the pitch angular rate sensor 16 and a roll angular rate signal $\dot\phi$ 90 from the roll angular rate sensor 12. The rollover prediction algorithm 80 utilizes measured acceleration and angular rate signals 82 through 90 together to produce the estimated current roll and pitch angles $\hat\phi$ and $\hat\theta$ and to further predict a vehicle rollover or pitchover condition of the vehicle. Generally speaking, the vehicle rollover prediction algorithm 80 preferably requires acceleration signals along the vehicle's longitudinal axis, lateral axis, and vertical axis, as well as pitch and roll angular rate signals.

Rollover prediction algorithm 80 averages each of the measured vehicle acceleration and angular rate signals 82 through 90 over a one-second time interval, according to one example. More particularly, average blocks 92 through 96 perform a one-second average of the corresponding measured longitudinal acceleration signal $\tilde{a}_x$ 82, lateral acceleration signal $\tilde{a}_y$ 84, and vertical acceleration signal $\tilde{a}_z$ 86, respectively. Likewise, average acceleration and attitude angles are modelled using discrete-time kinematic models driven by white noise. The longitude, latitude, and vertical acceleration components $a_x$, $a_y$, and $a_z$, respectively, and the angular pitch and rate angles [ - - - Unable To Translate Graphic - - - ] and [ - - - Unable To Translate Graphic - - - ] equations may be as provided as follows:

$$a_x = A_x \cos\theta - A_z \sin\theta + b_x + v_x$$

where $b_x$, $b_y$, and $b_z$ are longitudinal, latitudinal, and vertical accelerometer biases, respectively, and $v_x$, $v_y$, and $v_z$ represent white measurement noises. Each of the angular rate sensor measurements are modeled as being the sum of the true angular rate, sensor bias, and white measurement noise, where $b\_$ and $b\_$ are the two angular rate sensor biases, and $v\_$ and $v\_$ are white measurement noises.

The extended Kalman filter 102 runs with a loop time which generally can be longer than the sensor measurement time interval. According to one example, the extended Kalman filter 102 operates with a one-second loop time interval, as compared to a sensor measurement time interval of ten milliseconds (10 ms), for example. The extended Kalman filter loop time interval preferably should be equal to the time period over which average blocks 92 through 100 perform the corresponding average functions. The use of a slow extended Kalman filter 102 loop time may allow for a slower, less-expensive microprocessor to be used than would otherwise be required.

The roll and pitch angle estimates [ - - - Unable To Translate Graphic - - - ] and [ - - - Unable To Translate Graphic - - - ] coming out of the extended Kalman filter 102 are piece-wise constant, generally changing every extended Kalman filter loop time interval. To achieve roll and pitch angle estimates [ - - - Unable To Translate Graphic - - - ] and [ - - - Unable To Translate Graphic - - - ] blocks 98 and 100 perform a one-second average of the corresponding pitch angular rate signal $\dot\theta$ 88 and roll angular rate signal $\dot\phi$ 90, respectively.

The time averaged acceleration and angular rate signals are input to an extended Kalman filter 102. In effect, the extended Kalman filter 102 estimates both the current roll angle $\hat\phi$ and the current pitch angle $\hat\theta$ as a function of the vehicle's measured longitudinal acceleration, lateral acceleration, vertical acceleration, pitch angular rate, and roll angular rate. The extended Kalman filter 102 is a thirteenth-order, non-linear filter which is based on (1) the selection of physical quantities to be represented by state variables in the filter; (2) the dynamic models chosen to represent the interaction in time-evolution of the state variables; and (3) the measurement model chosen to represent how the available measurements are related to the values taken by the physical quantities represented in the state factors. The extended Kalman filter 102 handles non-linearities in the models, particularly in the measurement model. In connection with rollover prediction algorithm 80, the physical quantities represented in the extended Kalman filter 102 include three earth-based components of acceleration $A_x$, $A_y$, and $A_z$, the roll and pitch attitude angles $\phi$ and $\theta$, and the sensor biases for each of the five sensors. The acceleration and attitude angles are modelled using discrete-time kinematic models driven by white noise. The longitude, latitude, and vertical acceleration components $a_x$, $a_y$, and $a_z$, respectively, and the angular pitch and rate angles $\theta$ and $\phi$ equations may be as provided as follows:

$$\tilde{a}_x = A_x \cos\theta - A_z \sin\theta + b_x + v_x$$

$$\tilde{a}_y = A_x \sin\phi \sin\theta + A_y \cos\phi + A_z \sin\phi \cos\theta + b_y + v_y$$

$$\tilde{a}_z = A_x \cos\phi \sin\theta - A_y \sin\phi + A_z \cos\phi \cos\theta + b_z + v_z$$

$$\tilde{\theta} = \dot{\theta} + b_\theta + v_\theta$$

$$\tilde{\phi} = \dot{\phi} + b_\phi + v_\phi$$

where $b_x$, $b_y$, and $b_z$, are longitudinal, latitudinal, and vertical accelerometer biases, respectively, and $v_x$, $v_y$, and $v_z$ represent white measurement noises. Each of the angular rate sensor measurements are modeled as being the sum of the true angular rate, sensor bias, and white measurement noise, where $b_\theta$ and $b_\phi$ are the two angular rate sensor biases, and $v_\theta$ and $v_\phi$ are white measurement noises.

The extended Kalman filter 102 runs with a loop time which generally can be longer than the sensor measurement time interval. According to one example, the extended Kalman filter 102 operates with a one-second loop time interval, as compared to a sensor measurement time interval of ten milliseconds (10 ms), for example. The extended Kalman filter loop time interval preferably should be equal to the time period over which average blocks 92 through 100 perform the corresponding average functions. The use of a slow extended Kalman filter 102 loop time may allow for a slower, less-expensive microprocessor to be used than would otherwise be required.

The roll and pitch angle estimates $\hat{\phi}_{EkF}$ and $\hat{\theta}_{EkF}$ coming out of the extended Kalman filter 102 are piece-wise constant, generally changing every extended Kalman filter loop time interval. To achieve roll and pitch angle estimates $\hat{\phi}$ and $\hat{\theta}$ which are valid in the interior of the extended Kalman filter time interval, the time integrals of the sensed angular roll and pitch rates $\tilde{\phi}$ and $\tilde{\theta}$ are used. This is achieved by using integrators 108 and 110. The extended Kalman filter 102 determines bias associated with each of the measured signals input thereto. The bias signals determined for the pitch angular rate and roll angular rate signals are output and identified as $\hat{b}_\theta$ and $\hat{b}_\phi$, respectively. Roll rate bias signal $\hat{b}_\phi$ is subtracted from the measured roll angular rate signal $\tilde{\phi}$ via summing junction 106 and input to integrator 110. Likewise, pitch rate bias signal $\hat{b}_\theta$ is subtracted from the measured pitch angular rate signal $\tilde{\theta}$ via summing junction 104 and input to integrator 108. Accordingly, integrators 108 and 110 receive bias corrected pitch and rate signals every sensor measurement interval. In addition, integrators 108 and 110 receive the estimate of pitch angle $\hat{\phi}_{EkF}$ and roll angle $\hat{\theta}_{EkF}$ from the extended Kalman filter 102 every extended Kalman filter loop time. To get attitude angle estimates which are valid in the interior of the extended Kalman filter loop time interval, the integral of the sensed angular rates are used, being reset at the beginning of each filter loop time interval to the estimated roll or pitch angle values $\hat{\phi}_{EkF}$ or $\hat{\theta}_{EkF}$ indicated by the extended Kalman filter 102. Accordingly, integrators 108 and 110 output an updated estimate of current pitch angle $\hat{\theta}$ and an updated estimate of current roll angle $\hat{\phi}$.

With particular reference to FIG. 2B, rollover prediction algorithm 80 employs a pair of Taylor series predictors, particularly first Taylor series predictor 116 and second Taylor series predictor 118. The first Taylor series predictor 116 receives the estimated current pitch angle $\hat{\theta}$ output from integrator 108, the measured pitch angular rate signal $\tilde{\theta}$ and an estimated current pitch acceleration $\ddot{\theta}$. The estimated current pitch acceleration $\ddot{\theta}$ is produced via filter 112, which performs a derivative calculation on the measured pitch angular rate signal $\tilde{\theta}$. The Taylor series predictor 116 generates the predicted pitch angle $\theta_T$ as a function of the estimated pitch acceleration $\ddot{\theta}$, the pitch rate $\dot{\theta}$, and the estimated pitch angle $\hat{\theta}$. With the Taylor series predictor 116, the vehicle rollover prediction algorithm 80 predicts a pitch angle $\theta_T$ an advance time T into the future. The pitch angle time-history in the neighborhood of the current time is approximated by the Taylor series predictor 116 as a weighted sum, which may be approximated as follows:

$$\theta_T = \hat{\theta} + T\tilde{\theta} + \tfrac{1}{2} T^2 \ddot{\theta},$$

The Taylor series prediction of the predicted pitch angle $\theta_T$ is therefore a function of the estimate of the current pitch angle $\hat{\theta}$ summed with the product of the desired warning time T and the measured current value of the pitch rate $\tilde{\theta}$, and further summed with the product of the desired warning time squared and the estimate of the current pitch acceleration $\ddot{\theta}$ divided by two.

The Taylor series predictor 118 generates the predicted roll angle $\phi_T$ as a function of the estimated roll acceleration $\ddot{\phi}$, the measured roll rate $\tilde{\phi}$, and the estimated roll angle $\hat{\phi}$ output from integrator 110. With the Taylor series predictor 118, the vehicle rollover prediction algorithm 80 predicts a roll angle $\phi_T$ an advance time T into the future. The roll angle time-history in the neighborhood of the current time is approximated by the Taylor series predictor 118 as a weighted sum, which may be approximated as follows:

$$\phi_T = \hat{\phi} + T\tilde{\phi} + \tfrac{1}{2} T^2 \ddot{\phi}$$

The Taylor series prediction of the predicted roll angle $\phi_T$ is therefore a function of the estimate of the current roll angle $\hat{\phi}$ summed with the product of the desired warning time T and the measured current value of roll rate $\tilde{\phi}$, and further summed with the product of the desired warning time squared and the estimate of the current roll acceleration $\ddot{\phi}$ divided by two. Units for the above equations are radians, seconds, radians-per-second, and radians-per-second squared. The desired warning time may be equal to 500 milliseconds, according to one example, so that enough advance warning is provided to deploy the necessary safety restraint device prior to the actual vehicle rollover condition occurring and before the occupants are too far out of position. Accordingly, the aforementioned Taylor series prediction equations show that the Taylor series approximation is evaluated according to an advance warning time T. While the above Taylor series prediction equations are shown as second order equations, it should also be appreciated that first order equations may be employed, such that the predicted roll angle $\phi_T$ is equal to the estimated roll angle $\hat{\phi}$ summed with the product of the desired warning time T and measured current roll rate $\dot{\phi}$, and such that the predicted pitch angle $\theta_T$ is equal to the estimated pitch angle $\hat{\theta}$ summed with the product of the desired warning time T and measured current pitch rate $\dot{\theta}$.

The absolute value of the predicted pitch angle $\theta_T$ is compared with a programmed pitch deployment threshold $\theta_0$ 122 by way of comparator 120. Deployment threshold $\theta_0$ 122 is a programmed, predetermined threshold value that is used to determine the prediction of a pitchover condition. According to one example, deployment pitch threshold $\theta_0$ 122 is set equal to approximately seventy degrees (70°). Comparator 120 produces a pitch deployment output signal 52 indicative of a predicted rollover condition, when the predicted pitch angle $\theta_T$ is greater than the deployment pitch threshold $\theta_0$ 122.

The absolute value of the predicted roll angle $\phi_T$ is compared with a programmed deployment roll threshold $\phi_0$ 126 by way of comparator 124. Deployment roll threshold $\phi_0$ 126 is a programmed predetermined threshold value that is used to determine the prediction of a rollover condition. According to one example, deployment threshold $\phi_0$ 126 is set equal to approximately fifty degrees (50°). Comparator 124 produces a rollover output signal 50 indicative of a predicted rollover condition, when the predicted roll angle $\phi_T$ is greater than the deployment roll threshold $\phi_0$ 126. The generated rollover output signal 50 and pitchover output signal 52 may be employed by any one or more selected devices to deploy occupant safety restraint devices or carry out other functions, as desired.

Figure 3:
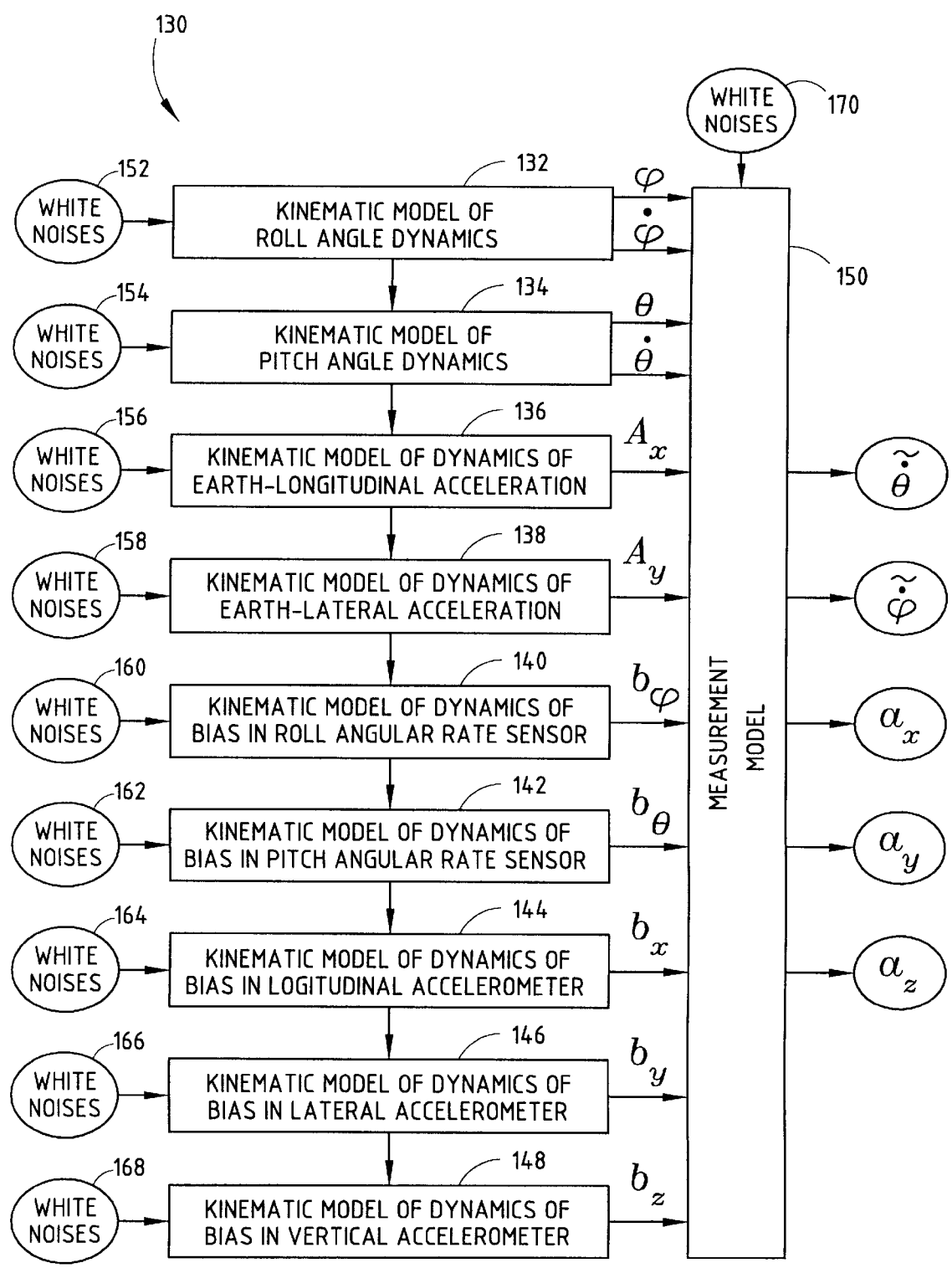
FIG. 3 is a block diagram illustrating process dynamics and measurement models for use in the extended Kalman filter of FIG. 2A.
Figure 7:
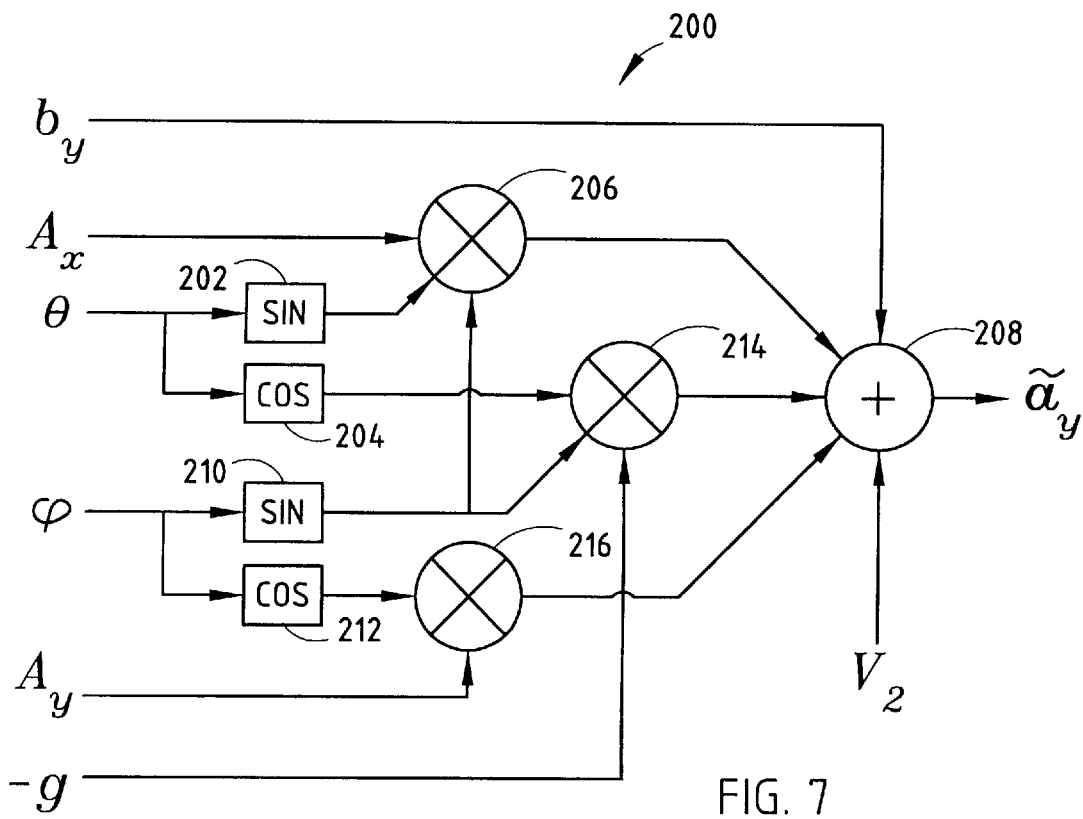
FIG. 7 is a block diagram illustrating a measurement model for the lateral acceleration signal of FIG. 3.
Figure 8:
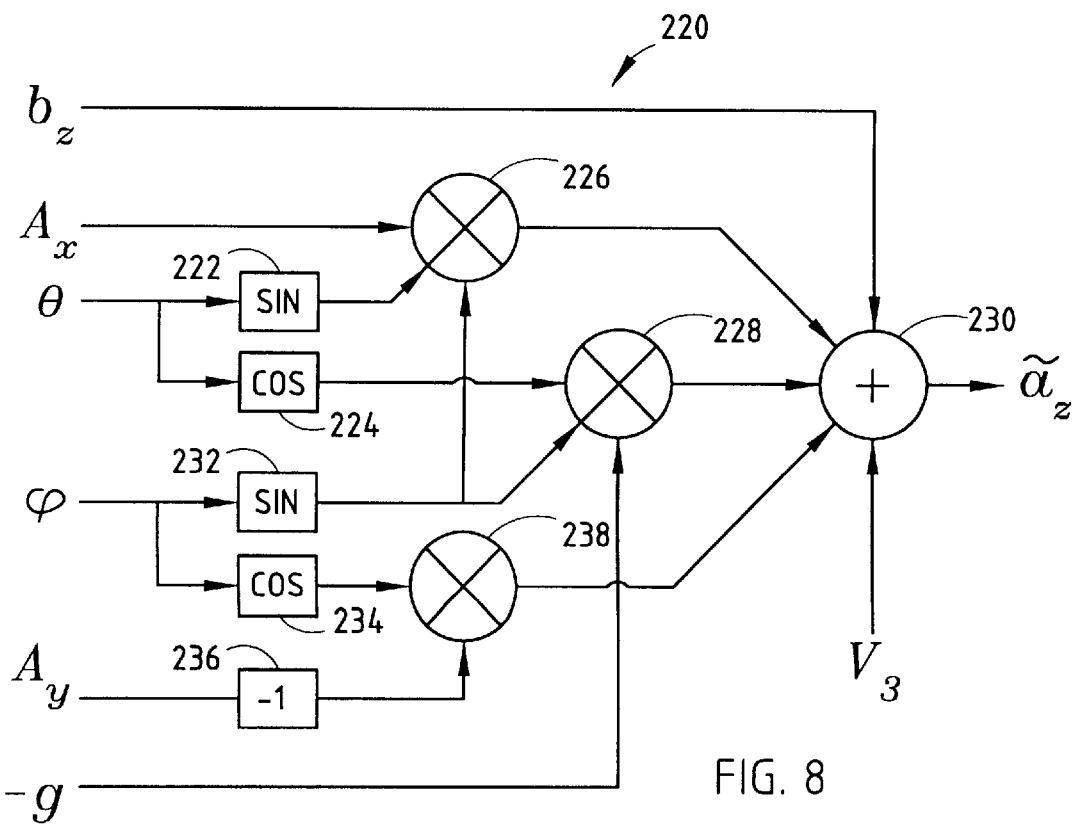
FIG. 8 is a block diagram illustrating the measurement model for the vertical acceleration signal of FIG. 3.

The rollover and pitchover sensing of the present invention employ a modeling 130 of process dynamics and measurement processes, as shown in FIG. 3, for use in the extended Kalman filter 102. The modeling 130 includes a kinematic model of roll angle dynamics 132 and a kinematic model of pitch angle dynamics 134. Also included is a kinematic model of dynamics of earth-longitudinal acceleration 136 and a kinematic model of dynamics of earth-lateral acceleration 138. The modeling further includes kinematic models of dynamics of bias in each of the sensors employed. The kinematic model of dynamics of bias include model 140 for the roll angular rate sensor 12, model 142 for the pitch angular rate sensor 16, model 144 for the longitudinal accelerometer 18, model 146 for the lateral accelerometer 14, and model 148 for the vertical accelerometer 20.

Each of the kinematic models 132–148 receives noise, referred to herein as "white noises," and is particularly referred to as white noises 152–168, respectively. The white noises generally represent uncertainties in the variations of the quantities being modeled. For example, with respect to the kinematic model of roll angle dynamics 132, white noises 152 may represent random variations in the roll acceleration, roll rate, and roll angle. Similarly, with respect to the kinematic model of earth-longitudinal acceleration 136, white noise 156 may represent random variations in the rate at which the earth-longitudinal acceleration is changing and in the earth-longitudinal acceleration itself.

In addition, model 130 further includes a measurement model identified as block 150, which receives inputs from each of the kinematic models 132–138. Additionally, measurement model 150 receives white noises 170 which represent noises in the measurement of each of the quantities that are being measured, including lateral acceleration, longitudinal acceleration, vertical acceleration, roll angular rate, and pitch angular rate, when attending to an overturn condition. The measurement is modeled as being whatever the true values of those measured values are, plus some unknown noise value. The measurement model 150 produces model outputs for the measured acceleration values $\tilde{a}_x$, $\tilde{a}_y$, and $\tilde{a}_z$ as well as the measured roll rate $\tilde{\dot{\phi}}$ and the measured pitch rate $\tilde{\dot{\theta}}$. The measurement model 150 may be represented by the measurement models illustrated in FIGS. 4–10, and described hereinafter.

The kinematic model of dynamics of earth-longitudinal acceleration 136 is shown in FIG. 4. Model 136 includes summing junction 172 and delay 174. Summing junction 172 sums white noises $W_1$ with a feedback of delay block 174. The delay output provides the earth-based longitudinal component change which is integrated by way of integrator 176. A summing junction 178 sums the integrated output with white noises $W_2$ and a delayed feedback from delay block 180. The output of delay block 180 provides the earth-based longitudinal component $A_x$, which is input to the measurement model 150.

The kinematic models 132, 136, and 138 of roll angle dynamics, pitch angle dynamics, and earth-lateral acceleration, respectively, are likewise modeled similar to model 136. Kinematic model 132 provides roll angle $\phi$ and roll rate $\dot{\phi}$ as an input to measurement model 150, while kinematic model 134 provides pitch angle $\theta$ and pitch rate $\dot{\theta}$ to measurement model 150. Likewise, the kinematic model 138 provides an earth-based lateral component $A_y$ to measurement model 150.

The kinematic models 140–148 of dynamics of bias of each of the sensors are modeled similar to each other. For illustrative purposes, the kinematic model of dynamics of bias in the longitudinal accelerometer 144 is shown in FIG. 5 for providing the longitudinal accelerometer bias $b_x$ as an input to measurement model 150. Measurement model 144 includes the summing junction 182 and delay block 184. Summing junction 182 sums white noises $W_3$ with the delayed output, while delay block 184 provides the longitudinal accelerometer bias $b_x$. Likewise, kinematic models 146 and 148 provide the lateral accelerometer bias $b_y$ and vertical accelerometer bias $b_z$ as inputs to measurement model 150. Kinematic models 140 and 142 provide the roll angular rate sensor bias $b_\phi$ and pitch angular rate sensor bias $b_\theta$ as inputs to measurement model 150.

The measurement model 150 is further illustrated in FIGS. 6–10. Measurement model 150 includes model 186 which receives longitudinal accelerometer bias $b_x$, earth-longitudinal acceleration $A_x$, pitch angle $\theta$ and the earth's gravitational force (i.e., acceleration) g and produces the modeled longitudinal acceleration $\tilde{a}_x$. Included in model 186 is a cosine function 188 and sine function 190, both of which receive pitch angle $\theta$ and produce the cosine and sine function, respectively, thereof. The cosine function 188 output is multiplied with earth-longitudinal acceleration $A_x$ via multiplier 192, and the multiplier 192 output is input to summing junction 196. The sine function 190 output is multiplied with the earth's gravitational force g via multiplier 194, and the multiplier 194 output is input to summing junction 196. Summing junction 196 sums the longitudinal accelerometer bias $b_x$ with the outputs of multipliers 192 and 194 and further with white measurement noise $V_1$, and produces the modeled longitudinal acceleration measurement $\tilde{a}_x$.

Measurement model 150 also includes model 200, which receives the lateral accelerometer bias $b_y$, earth-longitudinal acceleration $A_x$, pitch angle $\theta$, roll angle $\phi$, earth-lateral acceleration $A_y$, and the negative of the earth's gravitational force g, and produces the modeled lateral acceleration measurement $\tilde{a}_y$. Included in model 200 is sine function 202 and cosine function 204 for receiving the pitch angle θ and producing respective sine and cosine functions thereof. Measurement model 200 further includes sine function 210 and cosine function 212 for receiving the roll angle φ in producing respective sine and cosine functions thereof. A multiplier 206 multiplies the output of sine function 202 with the earth-longitudinal acceleration $A_x$ and also with the output of sine function 210, and produces an output that is applied as an input to summing junction 208. A multiplier 216 multiplies the output of cosine function 212 with the earth-lateral acceleration $A_y$ and produces an output that is input to summing junction 208. A multiplier 214 multiplies the output of cosine function 204 with the output of sine function 210 and further with the negative of the earth's gravitational force g, and produces an output that is input to summing junction 208. Summing junction 208 sums the outputs of multipliers 206, 214, and 216 with the lateral accelerometer bias $b_y$ and white noise $V_2$ and produces the modeled lateral accelerometer measurement $\tilde{a}_y$ as an output.

Also included in measurement model 150 is model 220, which receives the vertical accelerometer bias $b_z$, earth-longitudinal acceleration $A_x$, pitch angle θ, roll angle φ, earth-lateral acceleration $A_y$, and the negative of the earth's gravitational force g, and produces the modeled vertical accelerometer measurement $\tilde{a}_z$. Included in model 220 is a sine function 222 and cosine function 224 for receiving pitch angle θ and producing respective sine and cosine functions thereof. Also included is sine function 232 and cosine function 234 for receiving the roll angle φ and producing respective sine and cosine functions thereof. A multiplier 226 multiplies the earth-longitudinal acceleration $A_x$ with the output of sine function 222 and the output of sine function 232, and generates an output that is input to summing junction 230. An invertor 236 inverts the earth-lateral acceleration $A_y$. Multiplier 238 multiplies the inverted earth-lateral acceleration $A_y$ with the output of cosine function 234 and produces an output that is input to summing junction 230. Another multiplier 228 multiplies the output of cosine function 224 with the output of sine function 232 and the negative of the earth's gravitational force g, and produces an output that is input to summing junction 230. Summing junction 230 sums the outputs of multipliers 226, 228, and 238 with the vertical accelerometer bias $b_z$ and white noise $V_3$ to produce the modeled vertical acceleration measurement $\tilde{a}_z$.

Measurement model 150 further provides the roll rate $\tilde{\phi}$ and pitch rate $\tilde{\theta}$ by way of models 240 and 244 as shown in FIGS. 9 and 10, respectively. Model 240 includes a summing junction 242 for summing the roll rate $\dot{\phi}$ with the roll angular rate sensor bias $b_\phi$ and white noise $V_4$ to produce the modeled roll rate measurement $\tilde{\phi}$. Likewise, model 244 includes a summing junction 246 for summing the pitch rate $\dot{\theta}$ with the pitch angular rate sensor bias $b_\theta$ and white noise $V_5$ to produce the modeled pitch rate measurement $\tilde{\theta}$.

Figure 11:
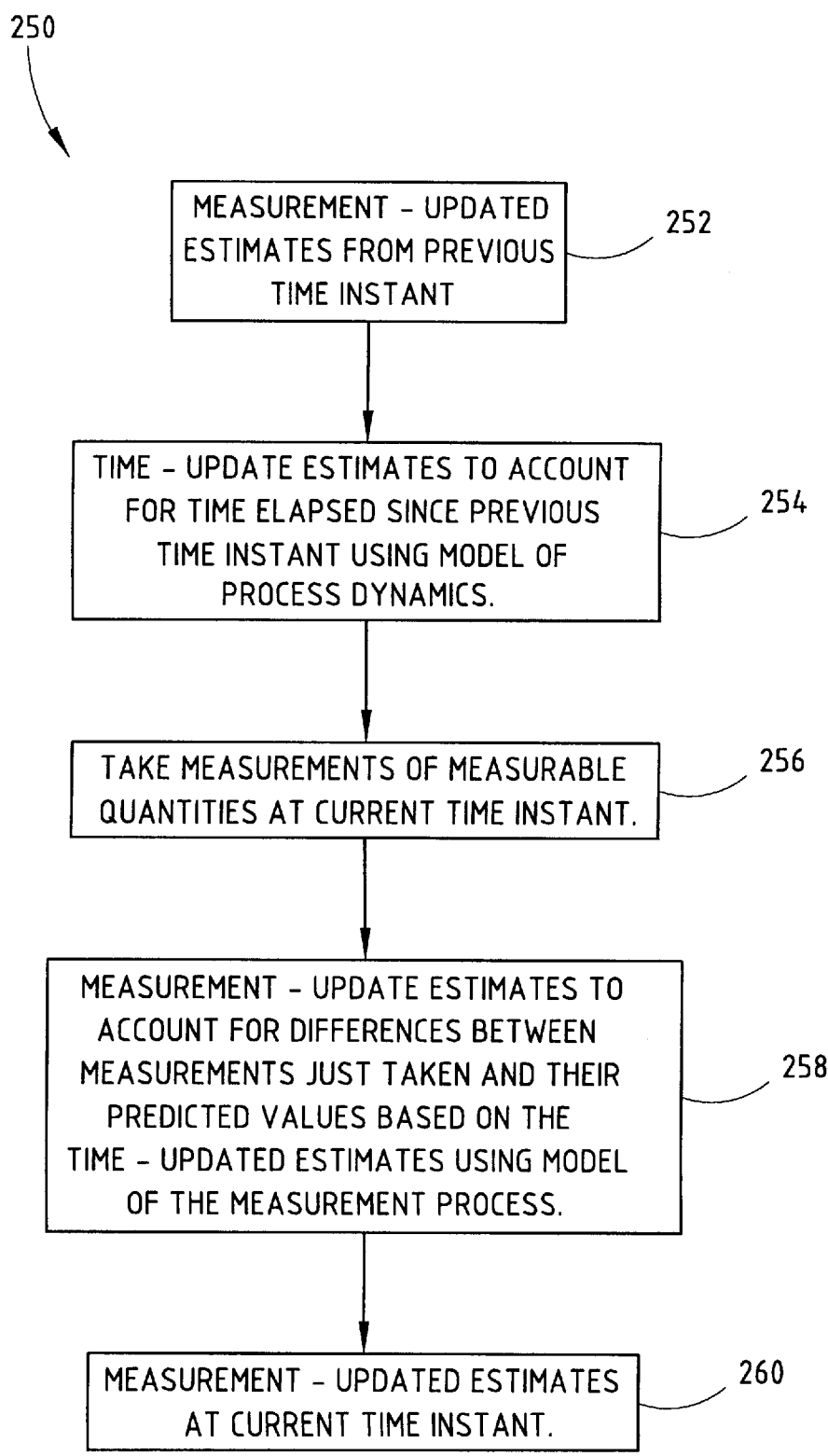
FIG. 11 is a flow diagram generally illustrating processing steps of the extended Kalman filter.

The extended Kalman filter 102 of the present invention performs both the time-update extended Kalman filter estimates as well as the measurement-update extended Kalman filter estimates. Referring to FIG. 11, a methodology 250 of processing information in accordance with the extended Kalman filter 102 is provided therein. Methodology 250 includes receiving measurement-updated estimates from the previous time instant pursuant to block 252. The estimates are time-updated to account for time that has elapsed since the previous time instant using the model of process dynamics as provided in block 254. Proceeding to block 256, methodology 250 takes measurements of measurable quantities at the current time instant. Proceeding to block 258, the estimates are measurement-updated to account for differences between measurements just taken and their predicted values based on the time-updated estimates using the model of measurement process. Referring to block 260, measurement-updated estimates at the current time instant are provided.

Figure 12:
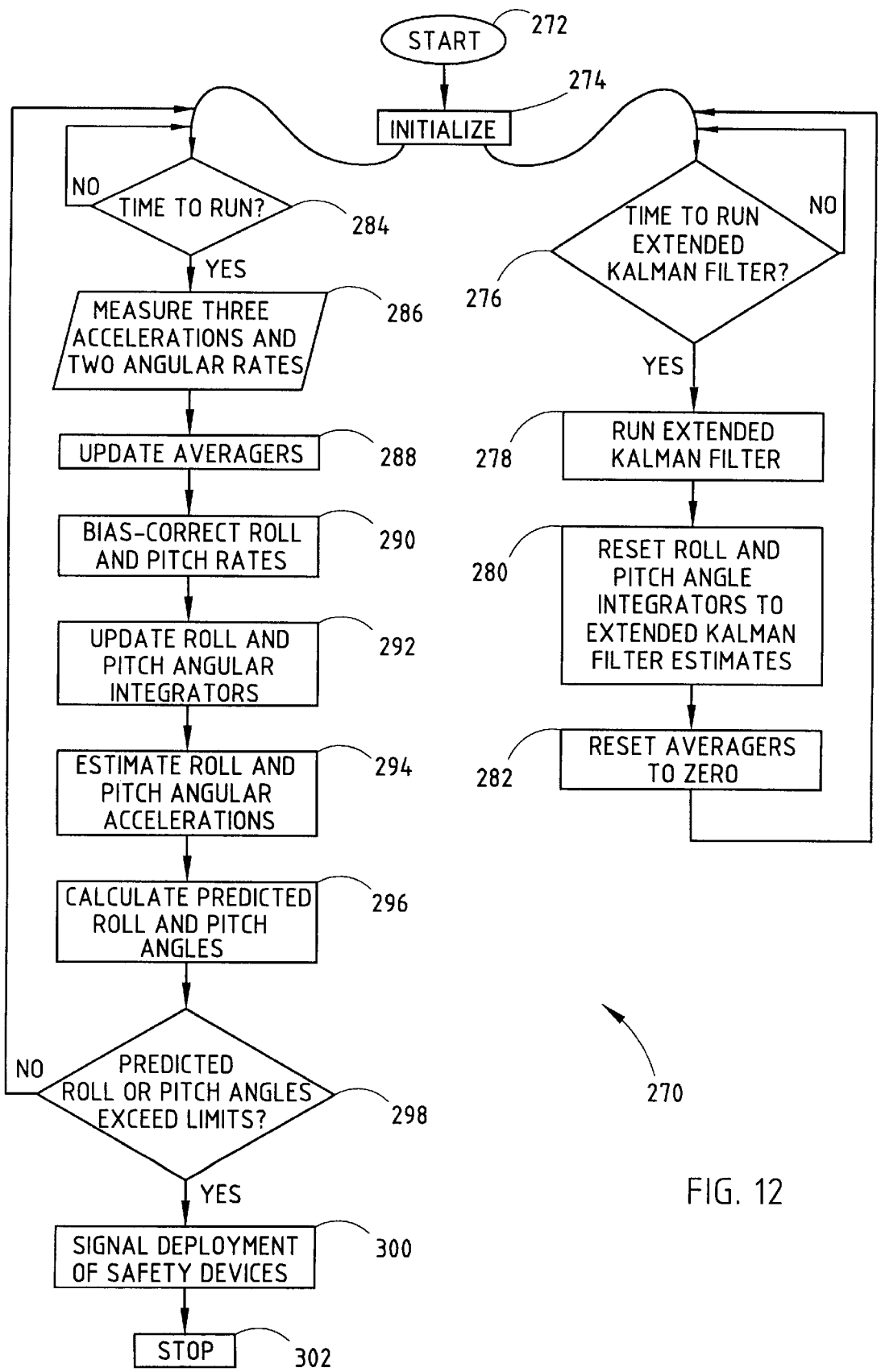
FIG. 12 is a flow diagram illustrating a methodology for predicting rollover and pitchover conditions of a vehicle according to the present invention.

Referring to FIG. 12, a rollover prediction methodology 270 is shown for predicting a vehicle rollover or pitchover condition and deploying one or more safety devices in response thereto. Rollover prediction methodology 270 begins with start block 272 and proceeds to initialize the extended Kalman filter and initialization block 274. Initialization of the extended Kalman filter 102 includes initializing all variables to zero or other appropriate values based on any available prior information. In addition, the five measurement averagers 92 through 100, as well as the roll and pitch angle integrators 108 and 110, are initialized to zero. Deployment flags and other flags are initialized to their proper values also. The angular acceleration filters 112 and 114 are further initialized. Once initialization is complete, methodology 270 simultaneously performs two distinct flow paths running in parallel. The loop path defined by blocks 276 through 282 involves a slow loop time process that runs with a loop time of approximately one second. The loop path defined by blocks 284 through 298 is a fast loop time process that runs with a loop time of approximately ten milliseconds (10 ms), according to one example.

Referring to the slow loop time process, methodology 270 checks to see if it is time to run the extended Kalman filter 102 pursuant to decision block 276. The decision to run the extended Kalman filter occurs at approximately every one-second time interval. If the slow loop time of one second has elapsed, methodology 270 proceeds to run the extended Kalman filter pursuant to block 278. One loop of the extended Kalman filter is run using the measurements averaged over the previous one-second interval as determined by average blocks 92 through 100. The loop time includes both a time-update and a measurement-update and produces estimates of roll and pitch angles, as well as bias estimates for each of the sensors. Next, pursuant to block 280, methodology 270 resets the roll and pitch angle estimates $\hat{\phi}_{EKF}$ and $\hat{\theta}_{EKF}$ input to integrators 110 and 108, respectively, to the newly calculated estimate values as determined by the extended Kalman filter 102. The values in the roll and pitch angle integrators 110 and 108 are thereby replaced by the latest roll angle and pitch angle estimates produced by the extended Kalman filter. Until the next time the extended Kalman filter runs, the roll and pitch angle estimates contained in integrators 110 and 108 will be updated with the fast loop time process using the bias-corrected roll and pitch rates as will be discussed hereinafter. To complete the slow loop time process, block 282 resets the five measurement averagers 92 through 100 back to zero, which allows the extended Kalman filter 102 in the next slow loop to have as inputs the averages of the five measurements over the preceding slow loop time interval of one second. Methodology 270 continues to run the slow loop time process every one second.

With respect to the fast process loop, methodology 270 proceeds to decision block 284 to check to see if a fast loop time interval has elapsed, indicating that it is time to run the fast loop process of methodology 270. Once the fast loop time has elapsed, block 286 measures the longitudinal, lateral, and vertical accelerations and the pitch and roll angular rates. The values output from the five sensors are recorded. In block 288, each of the averagers 92 through 100 records the average value of its respective measurement input over the time interval beginning with the last time the slow loop was entered, i.e., each one second. Next, in block 290, the latest measured values of roll rate and pitch rate are corrected using the latest estimates of roll angular rate bias $\hat{b}_\phi$ and pitch angular rate bias $\hat{b}_\theta$ outputs from the extended Kalman filter 102.

Methodology 270 proceeds to block 292 to update the roll and pitch angular integrators 110 and 108. For both the roll and pitch, the product of the fast loop time and the respective bias-corrected angular rate is added into the value held by the corresponding integrator 108 or 110. The integrator values serve as the estimates for the current roll and pitch angles $\hat{\phi}$ and $\hat{\theta}$. In addition, methodology 290 estimates the roll and pitch angular accelerations as provided in block 294. A separate, simple Kalman filter may be used to estimate the time-derivatives of the bias-corrected measured roll rate and pitch rate signals to provide the estimated roll and pitch accelerations.

Given the estimated roll and pitch angles, roll and pitch accelerations, and measured roll and pitch angular rates, methodology 270 calculates the predicted roll and pitch angles $\phi_T$ and $\theta_T$ pursuant to block 296. The predicted roll angle $\phi_T$ is calculated by taking a weighted sum of the estimated roll angle, the roll rate, and the estimated roll acceleration. Likewise, the predicted pitch angle $\theta_T$ is calculated by taking a weighted sum of the estimated pitch angle, the pitch rate, and the estimated pitch acceleration. The weights in the weighted sum are essentially calibrations. Proceeding to decision block 298, methodology 270 checks to see if the predicted roll and pitch angles exceed the corresponding roll and pitch limits. The predicted roll and pitch angles are each checked to see if either of their magnitudes exceed the corresponding calibration threshold. According to one example, the predicted roll angle $\phi_T$ is compared to a threshold of fifty degrees (50°), while the predicted pitch angle $\theta_T$ is compared to a threshold angle of seventy degrees (70°). If neither of the pitch or roll angles exceed the corresponding threshold limits, methodology 270 returns to the beginning of the fast process loop. Otherwise, if either of the predicted roll or pitch angles exceeds the corresponding limits, methodology 270 predicts that a future rollover event is to occur and proceeds to block 300. The predicted rollover output may then be used to signal deployment of safety-restraint devices, as provided in block 300, so as to actuate, for example, a pop-up roll bar, a seat belt pretensioner, an air bag, or other selected devices. Following signalling of the deployment of the devices, methodology 270 is complete pursuant to stop block 302.

When used to deploy a safety-related function of the vehicle, the rollover condition prediction methodology 270 may be employed to deploy a non-reusable device. However, it should be appreciated that a resettable rollover condition sensing apparatus may be achieved to repeatedly deploy one or more devices without departing from the teachings of the present invention.

Accordingly, the rollover sensing apparatus and method of the present invention provides a prediction of a rollover or pitchover condition of a vehicle prior to the actual complete occurrence of a vehicle rollover or pitchover event so that selected devices may be deployed in a timely fashion to provide added protection to occupants of the vehicle. The rollover sensing apparatus of the present invention is relatively immune to substantial errors present in automotive-grade sensors and, therefore, provides enhanced rollover sensing for use with automotive-grade sensors, as well as reducing the number of sensors that may otherwise be required in previously known approaches.

Additionally, the rollover sensing module 10 and rollover prediction algorithm 80 of the present invention may further utilize the vehicle speed sensor (VSS) signal and/or wheel position sensor (WPL and WPR) signals for use in detection of a rollover and/or pitchover condition of a vehicle. The vehicle speed sensor signal, under some conditions, can be employed to provide an accurate representation of the vehicle's actual longitudinal acceleration. This allows for the pitch angle to be estimated under the assumption that the difference in longitudinal accelerations derived from the vehicle speed sensor and the longitudinal accelerometer is due to a gravitational component. In addition, knowledge that the vehicle is stopped can aid in the estimation of rollover sensor biases, particularly the angular rate sensor biases. If an inclinometer is made available, the accelerometer biases could also be estimated when the vehicle is known to be stopped. Further, in a situation where models of vehicle dynamics are used in the rollover algorithm, knowledge of the vehicle's speed, obtained from the vehicle speed sensor, would further aid in the rollover condition prediction of the present invention.

The left and right wheel position sensor (WPL and WPR) signals indicate the distance between each wheel center and the vehicle body. The wheel position sensor signals could be used to reduce the incidence of false deployments. The vehicle's suspension springs exert a strong force pushing the wheels away from the vehicle body, such that only contact with the ground keeps the wheels near the body. Centrifugal forces which are present in a rollover situation also work to pull the wheels away from the body. Since a vehicle generally does not rollover without one or more wheels leaving the ground, rollover deployment could be disabled unless at least one wheel is sufficiently far away from the vehicle body as detected by the wheel position sensors. Accordingly, the rollover sensing module 10 and rollover prediction algorithm 80 may utilize the wheel position sensors to provide a predicted rollover and/or pitchover condition output only if either the left or right side wheels of the vehicle are detected as having left the ground.

According to a second embodiment of the present invention, the vehicle rollover prediction methodology further estimates vehicle yaw rate and computes a correction to the measured pitch rate signal $\dot{\theta}$ and a correction to the measured roll rate signal $\dot{\phi}$. The calculated pitch rate and roll rate corrections provide enhanced accuracy pitch rate and roll rate signals which in turn improves the estimations of the vehicle's pitch angle and roll angle, respectively, particularly for conditions in which the vehicle experiences yaw rate. It has been discovered that under some conditions, the estimated pitch angle may drift away from the vehicle's actual pitch angle as the vehicle experiences yaw rate, particularly when the vehicle travels along a curve. In addition, it has also been discovered that the estimated roll angle may also drift away from the vehicle's actual roll angle when the vehicle experiences yaw rate. Under such a condition, the vehicle will generally roll outwardly and tilt relative to the ground. The sharper the turn and the faster the vehicle speed, generally the greater the amount of tilt experienced by the vehicle. As a consequence, the dynamics inducing the tilt may lead to a false measurement by the pitch angular rate sensor 16 and roll angular rate sensor 12.

Figure 13:
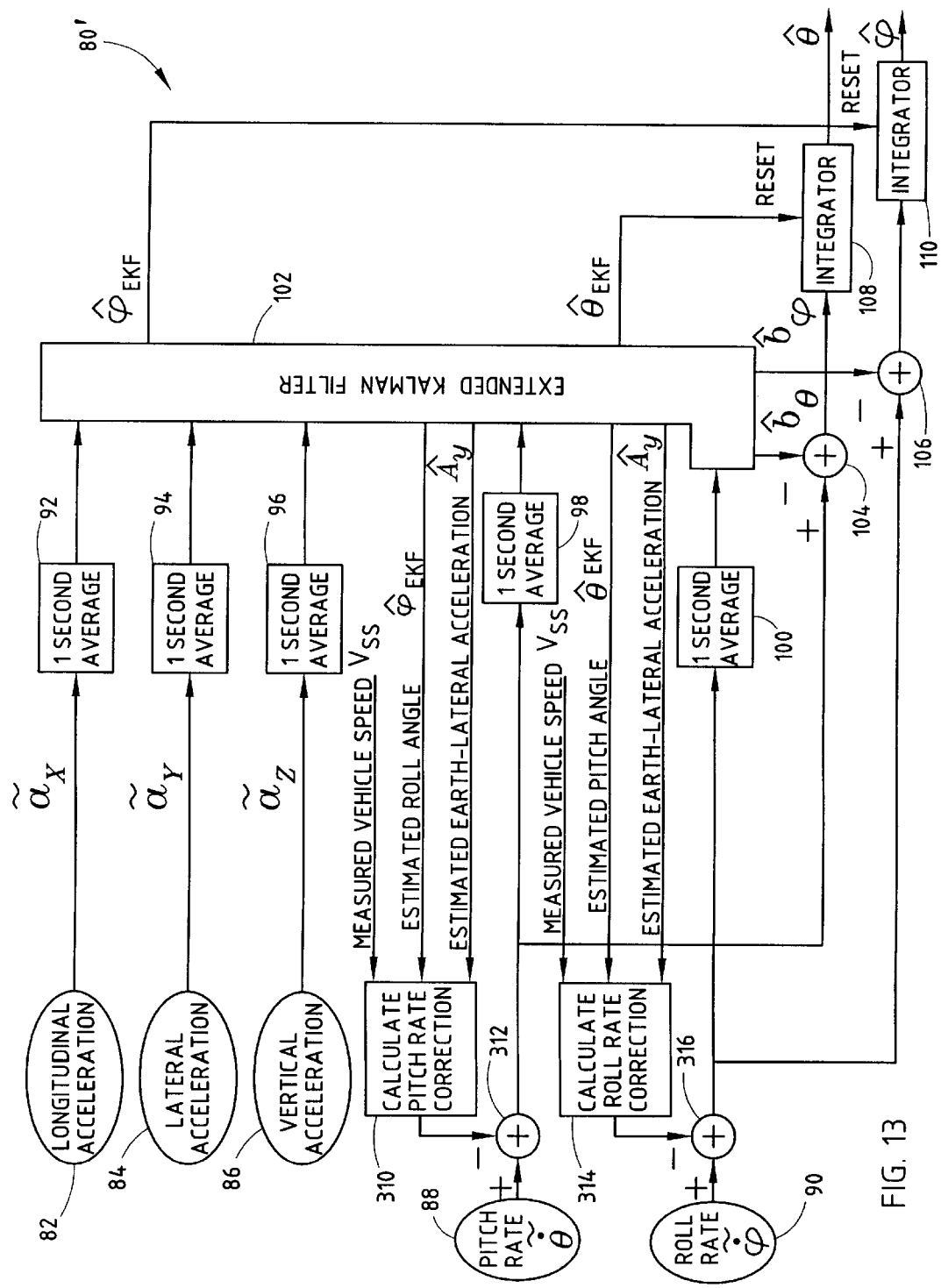
FIG. 13 is a block diagram illustrating the rollover sensing algorithm for estimating current roll and pitch angles as further embodied for correcting pitch rate and roll rate signals according to a second embodiment of the present invention.

Referring to FIG. 13, the rollover prediction algorithm 80 of FIGS. 2A and 2B is shown to the extent as modified and is identified as rollover prediction algorithm 80' according to the second embodiment of the present invention. Rollover prediction algorithm 80' is similar to algorithm 80 shown in FIGS. 2A and 2B, with the addition of pitch rate and roll rate correction as described hereinafter. More particularly, rollover prediction algorithm 80' includes a calculate pitch rate correction block 310 for calculating a pitch rate correction value and a summing junction 312 for subtracting the calculated pitch rate correction value from the measured pitch rate signal. The calculate pitch rate correction block 310 receives as inputs the measured vehicle speed signal (VSS), the estimated roll angle $\hat{\phi}_{EKF}$ as provided by the extended Kalman filter, and the estimated earth-lateral acceleration $\hat{A}_y$ as determined by the extended Kalman filter. Accordingly, the measured vehicle speed signal (VSS), estimated roll angle, and estimated earth-lateral acceleration values are processed to calculate the pitch rate correction value. The calculated pitch rate correction value is then subtracted from the measured pitch rate signal $\dot{\theta}$ that is generated by the pitch angular rate sensor 16. This pitch rate correction technique reduces measurement errors and provides for enhanced accuracy pitch rate measurement which leads to an improved estimation of the pitch angle, particularly when the vehicle experiences yaw rate.

Rollover prediction algorithm 80' further includes a calculate roll rate correction block 314 for calculating a roll rate correction value and a summing junction 316 for subtracting the calculated roll rate correction value from the measured roll rate signal. The calculate roll rate correction block 314 receives as inputs the measured vehicle speed signal (VSS), the estimated pitch angle $\hat{\theta}_{EKF}$ as determined by the extended Kalman filter, and the estimated earth-lateral acceleration $\hat{A}_Y$ as determined by the extended Kalman filter. Accordingly, the measured vehicle speed signal (VSS), estimated pitch angle, and estimated earth-lateral acceleration values are processed to calculate the roll rate correction value. The calculated roll rate correction value is then subtracted from the measured roll rate signal $\dot{\phi}$ that is generated by the roll angular rate sensor 12. This roll rate correction technique reduces measurement errors and provides enhanced accuracy roll rate measurement which leads to improved estimation of the roll angle, particularly when the vehicle experiences yaw rate.

Figure 14:
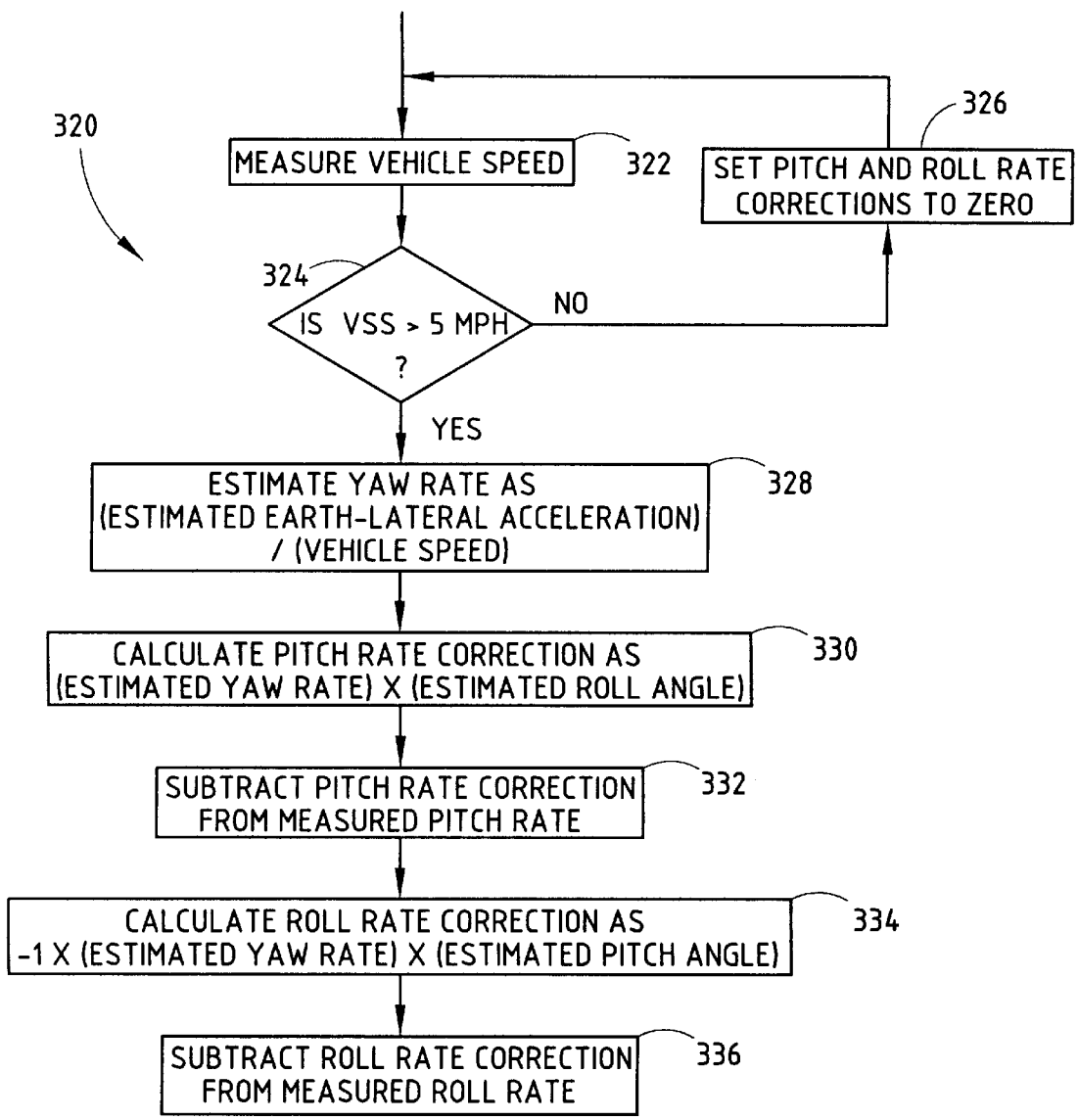
FIG. 14 is a flow diagram illustrating a methodology for providing correction to the measured pitch rate and measured roll rate signals for use in predicting a rollover or pitchover condition of a vehicle according to the second embodiment of the present invention.

Referring particularly to FIG. 14, a pitch and roll rate methodology 320 is illustrated for correcting measured pitch rate and roll rate, and is particularly provided to correct for yaw-induced errors, according to the present invention. Methodology 320 begins with step 322 in which the speed of the vehicle is measured with a speed sensor to produce the vehicle speed signal (VSS). Next, in step 324, methodology 320 checks to see if the vehicle speed signal is indicative of a vehicle speed greater than a predetermined low speed threshold of five miles-per-hour (5 mph), according to one example. If the vehicle speed does not exceed the predetermined low speed threshold, methodology 320 proceeds to set both the pitch rate correction value and roll rate correction value to zero pursuant to step 326, and then returns to step 322 to measure the vehicle speed.

If the vehicle speed is greater than the predetermined low speed threshold value, methodology 320 proceeds to estimate the yaw rate of the vehicle as a function of the estimated earth-lateral acceleration and vehicle speed as provided in step 328. More particularly, the estimated yaw rate is determined by dividing the estimated earth-lateral acceleration by the vehicle speed. According to this approach, the vehicle yaw rate estimation does not require a yaw gyro. Once the estimated yaw rate is computed, the pitch rate correction value is calculated as a function of estimated yaw rate and the estimated roll angle as provided in step 330. More particularly, the pitch rate correction value is calculated by multiplying the estimated yaw rate by the estimated roll angle. Once the calculated pitch rate correction value is determined, the pitch rate correction value is subtracted from the measured pitch rate signal as received from the pitch angular rate sensor 16 according to step 332.

In addition, rate correction methodology 320 further calculates the roll rate correction value as a function of the estimated yaw rate and estimated pitch angle as shown in step 334. More particularly, the roll rate correction value is calculated by multiplying the negative of the estimated yaw rate with the estimated pitch angle. Once the roll rate correction value is calculated, the roll rate correction value is subtracted from the measured roll rate signal that is received from roll angular rate sensor 12 pursuant to step 336.

Accordingly, methodology 320 calculates pitch rate and roll rate correction values and subtracts the corresponding correction values from the measured pitch rate and roll rate signals to realize a more accurate pitch rate and roll rate, despite the presence of any yaw-induced error. The corrected pitch rate and roll rate signals are then used to estimate the pitch angle and roll angle, respectively, as described above. The pitch angle and roll angle estimations are employed to predict if a rollover or pitchover condition of the vehicle is likely to occur.

The rate correction methodology 320 as discussed above assumes small angle approximations which allow for simplification of the overall roll rate and pitch rate correction computations. In accordance with the small angle approximations, the corrected roll rate and corrected pitch rate may be expressed by the following equations:

$$\dot{\phi} = \tilde{\dot{\phi}} + \hat{\gamma}\hat{\theta}$$

$$\dot{\theta} = \tilde{\dot{\theta}} - \hat{\gamma}\hat{\phi}$$

Where $\hat{\gamma}$ represents the estimated yaw rate.

According to a further embodiment of the present invention, the roll rate correction and pitch rate correction could be provided without the small angle approximations as follows:

$$\dot{\phi} = \tilde{\dot{\phi}} + \hat{\gamma}\sin\hat{\theta}$$

$$\dot{\theta} = \frac{1}{\cos\hat{\phi}}\left[\tilde{\dot{\theta}} - \hat{\gamma}\sin\hat{\phi}\cos\hat{\theta}\right]$$

Where the estimated yaw rate $\hat{\gamma}$ is multiplied by the estimated pitch angle $\hat{\theta}$ and summed with the measured roll rate $\dot{\phi}$ to provide the corrected roll rate. For pitch rate correction, the estimated yaw rate, $\dot{\gamma}$ is multiplied by both the sine of the estimated roll angle $\hat{\phi}$ and the cosine of the estimated pitch angle $\hat{\theta}$ and subtracted from the measured pitch rate $\dot{\theta}$, and further divided by cosine of the estimated roll angle $\hat{\phi}$. The inclusion of sine and cosine computations may provide for enhanced roll rate correction and pitch rate correction. On the other hand, the use of small-angle approximations, which assumes the cosine of x is approximately equal to one and the sine of x is approximately equal to x for small angles, avoids the calculation of sine and cosine functions and further eliminates a division operation with respect to the pitch rate correction to allow for fewer calculations.

Figure 15:
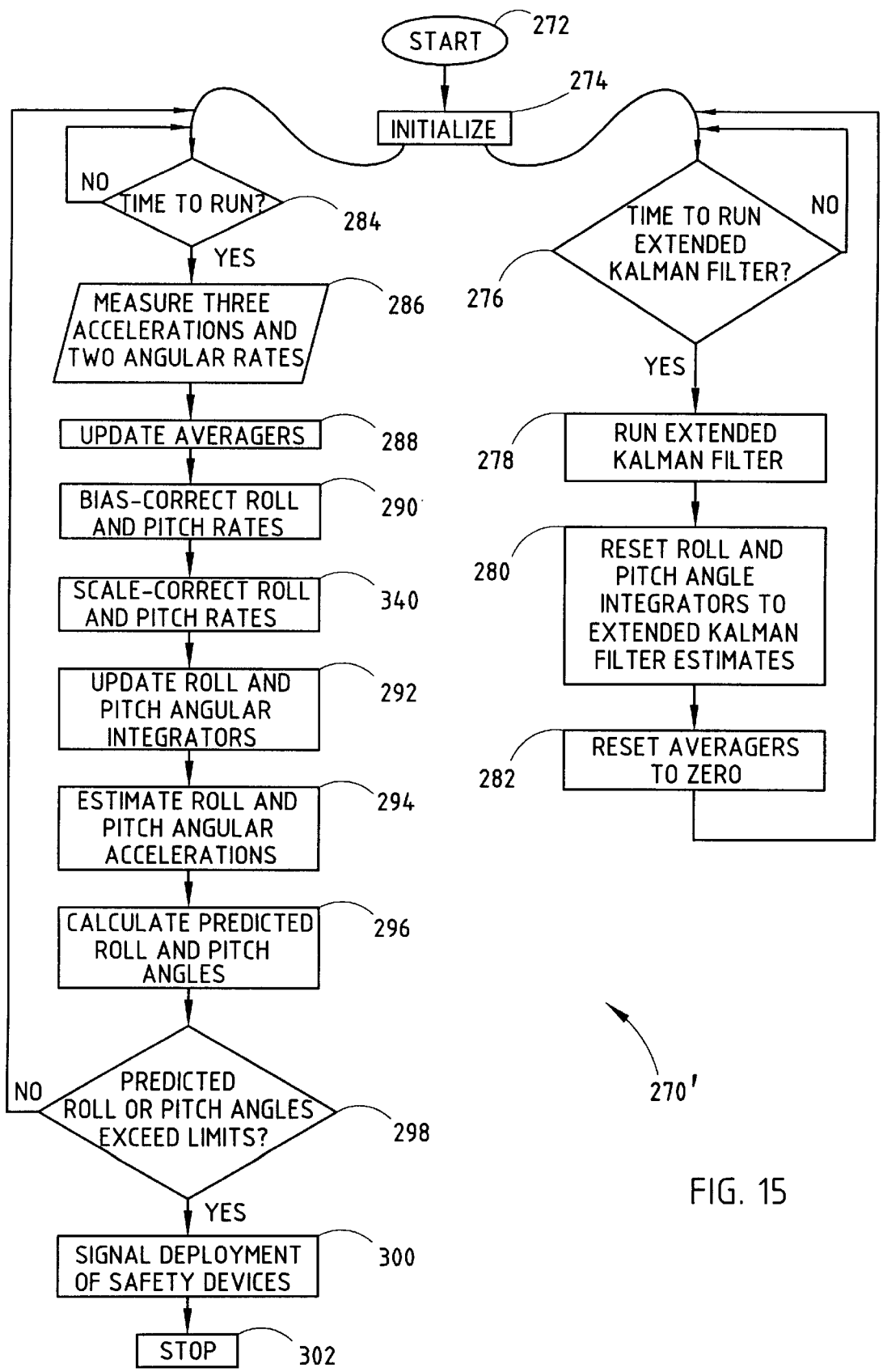
FIG. 15 is a flow diagram illustrating the methodology for predicting rollover and pitchover conditions of a vehicle further embodied to include scaling of sensor signals according to another embodiment of the present invention.

According to a further aspect of the present invention, the rollover prediction methodology 270 for predicting a vehicle rollover or pitchover condition may further include the step 340 of scale-correcting the measured angular roll rate and pitch rate signals as illustrated in FIG. 15. It should be appreciated that methodology 270 bias-corrects the roll rate and pitch rate signals as is provided in block 290. The bias correction of block 290 compensates for any calibration offset that may be present in the roll and pitch angular rate sensors 12 and 16. Similar to bias correction, the scale-correct roll and pitch rate step 340 corrects for the appropriate scaling of the roll and pitch angular rate sensors 12 and 16. The scaling factor is a multiplication factor that for a number of reasons could be out of scale for the roll and/or pitch angular rate sensors due to a number of possible causes. For example, temperature changes, manufacturing tolerance variations, or other variations in manufactured angular rate sensors may lead to variations in sensor scaling. To accommodate for such scaling differences, the added step scale-correction provides scaling to adjust the sensor outputs to a more accurate scaling factor.

The step 340 of scale-correcting the roll rate and pitch rate signals may be provided similar to the bias-corrected roll and pitch rates as described in connection with the modeling provided for bias-correction. In so doing, the bias signals are preferably replaced with scaling signals, and instead of providing an additive offset as is the case for a bias-correction, the scale-correction requires a multiplication scaling factor applied to the measured signals to realize scaling correction.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The claimed invention is:

1. A rollover sensing apparatus for predicting an overturn condition for a vehicle, comprising:

an angular roll rate sensor for sensing roll rate of a vehicle and producing an output signal indicative thereof;

an angular pitch rate sensor for sensing pitch rate of the vehicle and producing an output signal indicative thereof;

a longitudinal accelerometer for measuring longitudinal acceleration of the vehicle and producing an output signal indicative thereof;

a lateral accelerometer for measuring lateral acceleration of the vehicle and producing an output signal indicative thereof;

a vertical accelerometer for measuring vertical acceleration of the vehicle and producing an output signal indicative thereof;

a vehicle speed signal indicative of speed of the vehicle;

a processor for receiving said signals and for estimating a roll angle and a pitch angle as a function of said received signals, said processor estimating a yaw rate of the vehicle as a function of lateral acceleration and said vehicle speed signal, and determining a pitch rate correction value as a function of said estimated yaw rate and said estimated roll angle and further correcting said measured pitch rate signal based on said pitch correction value, and said processor predicting a future pitch angle as a function of said estimated pitch angle and said corrected pitch rate and comparing said predicted pitch angle to a threshold value; and an output for deploying a vehicle overturn condition output based on said comparison.

2. The apparatus as defined in claim 1, wherein said processor further determines a roll rate correction value as a function of said estimated yaw rate and said estimated pitch angle, and corrects said measured roll rate signal based on said roll correction value, said processor further predicting a future roll angle as a function of said estimated roll angle and said corrected roll rate and comparing said predicted roll angle to a threshold value to predict a rollover condition.

3. The apparatus as defined in claim 1, wherein said lateral acceleration for estimating yaw rate comprises an estimated lateral acceleration relative to earth.

4. The apparatus as defined in claim 1, wherein said estimated yaw rate is estimated as a function of said lateral acceleration divided by vehicle speed.

5. The apparatus as defined in claim 1, wherein said pitch rate correction value is determined as a function of said estimated yaw rate multiplied by said estimated roll angle.

6. The apparatus as defined in claim 1, wherein one or more of said received signals are scaled by a scaling factor.

7. The apparatus as defined in claim 1, wherein said processor includes a non-linear filter for estimating said roll and pitch angles.

8. The apparatus as defined in claim 7, wherein said non-linear filter comprises an extended Kalman filter.

9. The apparatus as defined in claim 1, wherein said processor includes a Taylor series-based predictor for providing said prediction of said future pitch angle.

10. A rollover sensing apparatus for predicting an overturn condition for a vehicle, comprising:

an angular roll rate sensor for sensing roll rate of a vehicle and producing an output signal indicative thereof;

an angular pitch rate sensor for sensing pitch rate of the vehicle and producing an output signal indicative thereof;

a longitudinal accelerometer for measuring longitudinal acceleration of the vehicle and producing an output signal indicative thereof;

a lateral accelerometer for measuring lateral acceleration of the vehicle and producing an output signal indicative thereof;

a vertical accelerometer for measuring vertical acceleration of the vehicle and producing an output signal indicative thereof;

a vehicle speed signal indicative of speed of the vehicle;

a processor for receiving said signals and for estimating a roll angle and a pitch angle as a function of said received signals, said processor estimating a yaw rate of the vehicle as a function of lateral acceleration and said vehicle speed signal, and determining a roll rate correction value as a function of said estimated yaw rate and said estimated pitch angle and further correcting said measured roll rate signal based on said roll correction value, and said processor predicting a future roll angle as a function of said estimated roll angle and said corrected roll rate and comparing said predicted roll angle to a threshold value; and an output for deploying a vehicle overturn condition output based on said comparison.

11. The apparatus as defined in claim 10, wherein said processor further determines a pitch rate correction value as a function of said estimated yaw rate and said estimated roll angle, and corrects said measured pitch rate signal based on said pitch correction value, said processor further predicting a future pitch angle as a function of said estimated pitch angle and said corrected pitch rate and comparing said predicted pitch angle to a threshold value to predict a pitchover condition.

12. The apparatus as defined in claim 10, wherein said lateral acceleration for estimating yaw rate comprises an estimated lateral acceleration relative to earth.

13. The apparatus as defined in claim 10, wherein said estimated yaw rate is estimated as a function of said lateral acceleration divided by vehicle speed.

14. The apparatus as defined in claim 10, wherein said roll rate correction value is determined as a function of said estimated yaw rate multiplied by said estimated pitch angle.

15. The apparatus as defined in claim 10, wherein one or more of said received signals are scaled by a scaling factor.

16. An apparatus for estimating a yaw corrected attitude rate of a vehicle comprising:

an angular roll rate sensor for measuring roll rate of a vehicle and producing an output signal indicative thereof;

an angular pitch rate sensor for measuring pitch rate of the vehicle and producing an output signal indicative thereof;

a longitudinal accelerometer for measuring longitudinal acceleration of the vehicle and producing an output signal indicative thereof;

a lateral accelerometer for measuring lateral acceleration of the vehicle and producing an output signal indicative thereof;

a vertical accelerometer for measuring vertical acceleration of the vehicle and producing an output signal indicative thereof;

a vehicle speed signal indicative of speed of the vehicle; and a processor for estimating yaw rate of the vehicle as a function of lateral acceleration and said vehicle speed signal, and determining an angular rate correction value as a function of said estimated yaw rate and an estimated attitude angle, said processor further subtracting said determined angular rate correction value from said measured attitude rate to provide a yaw corrected attitude rate.

17. The apparatus as defined in claim 16, further comprising a non-linear filter for receiving signals from said angular roll rate and pitch rate sensors and said longitudinal, lateral, and vertical accelerometers, and said non-linear filter estimating a roll angle and a pitch angle based on said received signals.

18. The apparatus as defined in claim 17, wherein said non-linear filter comprises an extended Kalman filter.

19. A method for predicting an overturn condition of a vehicle, said method comprising the steps of:

sensing angular roll rate of a vehicle and producing an output signal indicative thereof;

sensing angular pitch rate of the vehicle and producing an output signal indicative thereof;

sensing longitudinal acceleration of the vehicle and producing an output signal indicative thereof;

sensing lateral acceleration of the vehicle and producing an output signal indication thereof;

sensing vertical acceleration of the vehicle and producing an output signal indicative thereof;

receiving a vehicle speed signal indicative of speed of the vehicle;

estimating a roll angle and a pitch angle as a function of said received signals;

estimating a yaw rate of the vehicle as a function of lateral acceleration and said vehicle speed signal;

determining a pitch rate correction value as a function of said estimated yaw rate and said estimated roll angle;

correcting said measured pitch rate signal based on said pitch corrected value;

predicting a future pitch angle as a function of said estimated pitch angle and said corrected pitch rate;

comparing said predicted pitch angle to a threshold value; and deploying a vehicle overturn condition output based on said comparison step.

20. The method as defined in claim 19, further comprising the steps of:

determining a roll rate correction value as a function of said estimated yaw rate and said estimated pitch angle;

correcting said measured roll rate signal based on said roll correction value;

predicting a future roll angle as a function of said estimated pitch angle and said corrected roll rate;

comparing said predicted roll angle to a roll threshold value; and deploying a vehicle overturn condition output based on said roll comparison.

21. The method as defined in claim 19, wherein said step of estimating yaw rate includes dividing said lateral acceleration by said vehicle speed signal.

22. The method as defined in claim 19, wherein said step of determining pitch rate correction value includes multiplying said estimated aw rate by said estimated roll angle.

23. The method as defined in claim 19, further comprising the step of estimating a scaling factor for one or more of said input signals and further multiplying said estimated scaling factor by said one or more received signals.

24. A method for predicting an overturn condition of a vehicle, said method comprising the steps of:

sensing angular roll rate of a vehicle and producing an output signal indicative thereof;

sensing angular pitch rate of the vehicle and producing an output signal indicative thereof;

sensing longitudinal acceleration of the vehicle and producing an output signal indicative thereof;

sensing lateral acceleration of the vehicle and producing an output signal indication thereof;

sensing vertical acceleration of the vehicle and producing an output signal indicative thereof;

receiving a vehicle speed signal indicative of speed of the vehicle;

estimating a roll angle and a pitch angle as a function of said received signals;

estimating a yaw rate of the vehicle as a function of lateral acceleration and said vehicle speed signal;

determining a pitch rate correction value as a function of said estimated yaw rate and said estimated roll angle;

correcting said measured pitch rate signal based on said pitch correction value;

predicting a future pitch angle as a function of said estimated pitch angle and said corrected pitch rate;

comparing said predicted pitch angle to a threshold value; and deploying a vehicle overturn condition output based on said comparison step.

25. The method as defined in claim 24, further comprising the steps of:
   determining a roll rate correction value as a function of said estimated yaw rate and said estimated pitch angle;
   correcting said measured roll rate signal based on said roll correction value;
   predicting a future roll angle as a function of said estimated roll angle and said corrected roll rate;
   comparing said predicted roll angle to a roll threshold value; and
   deploying a vehicle overturn condition output based on said roll comparison step.

26. The method as defined in claim 24, wherein said step of estimating yaw rate includes dividing said lateral acceleration by said vehicle speed signal.

27. The method as defined in claim 24, wherein said step of determining pitch rate correction value includes multiplying said estimated yaw rate by said estimated roll angle.

28. The method as defined in claim 24, further comprising the step of estimating a scaling factor for one or more of said input signals and further multiplying said estimated scaling factor by said one or more received signals.

* * * * *